United States Patent
Suzuki et al.

(10) Patent No.: US 10,103,859 B2
(45) Date of Patent: Oct. 16, 2018

(54) TERMINAL APPARATUS, BASE STATION APPARATUS, INTEGRATED CIRCUIT, AND COMMUNICATION METHOD

(71) Applicant: Sharp Kabushiki Kaisha, Osaka-shi, Osaka (JP)

(72) Inventors: Shoichi Suzuki, Osaka (JP); Toshizo Nogami, Osaka (JP); Tatsushi Aiba, Osaka (JP); Kazunari Yokomakura, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 14/903,069

(22) PCT Filed: Jul. 10, 2014

(86) PCT No.: PCT/JP2014/068459
§ 371 (c)(1),
(2) Date: Jan. 6, 2016

(87) PCT Pub. No.: WO2015/005438
PCT Pub. Date: Jan. 15, 2015

(65) Prior Publication Data
US 2016/0164645 A1    Jun. 9, 2016

(30) Foreign Application Priority Data
Jul. 11, 2013    (JP) .................................. 2013-145348

(51) Int. Cl.
*H04W 72/00* (2009.01)
*H04L 5/00* (2006.01)

(52) U.S. Cl.
CPC ............ *H04L 5/005* (2013.01); *H04L 5/0007* (2013.01); *H04L 5/0048* (2013.01);
(Continued)

(58) Field of Classification Search
CPC .......................... H04W 72/005; H04L 5/0048
See application file for complete search history.

(56) References Cited

U.S. PATENT DOCUMENTS

| | | | | |
|---|---|---|---|---|
| 2013/0114496 A1* | 5/2013 | Mazzarese | ............ | H04L 5/0023 370/312 |
| 2013/0329625 A1* | 12/2013 | Lee | ...................... | H04W 74/08 370/312 |

(Continued)

OTHER PUBLICATIONS

Samsung, "CRS Presence in Flexible Subframes"; 3GPP TSG RAN WG1 #73; R1-131967; May 11, 2013; 3 pages.
(Continued)

*Primary Examiner* — Christopher Crutchfield
(74) *Attorney, Agent, or Firm* — Keating & Bennett, LLP

(57) ABSTRACT

A base station apparatus transmits first information indicating a subframe in which a cell-specific reference signal (CRS) is present, and second information which indicates a subframe other than a subframe indicated as the subframe in which the CRS is present by the first information, as a multicast broadcast single frequency network (MBSFN) subframe, to a terminal apparatus. Accordingly, the base station apparatus can efficiently communicate with a terminal apparatus using a downlink physical channel.

4 Claims, 14 Drawing Sheets

| NUMBER OF CRS ANTENNA PORTS | $P_B$ | $P_B/P_A$ |
|---|---|---|
| 0 | 0-4 | — |
| 1 | 0 | 1 |
| 1 | 1 | 4/5 |
| 1 | 2 | 3/5 |
| 1 | 3 | 2/5 |
| 2 OR 4 | 0 | 5/4 |
| 2 OR 4 | 1 | 1 |
| 2 OR 4 | 2 | 3/4 |
| 2 OR 4 | 3 | 1/2 |

(52) U.S. Cl.
CPC .......... *H04L 5/0053* (2013.01); *H04L 5/0091* (2013.01); *H04W 72/005* (2013.01); *H04L 5/0035* (2013.01)

(56) References Cited

U.S. PATENT DOCUMENTS

| | | | | |
|---|---|---|---|---|
| 2013/0336214 | A1* | 12/2013 | Sayana | H04B 7/024 370/328 |
| 2014/0044061 | A1* | 2/2014 | Yue | H04W 72/042 370/329 |
| 2014/0064133 | A1* | 3/2014 | Kazmi | H04W 24/10 370/252 |
| 2014/0092829 | A1* | 4/2014 | Han | H04L 5/0053 370/329 |
| 2015/0023331 | A1* | 1/2015 | You | H04L 5/0048 370/336 |

OTHER PUBLICATIONS

Samsung; "Downlink Control Signalling for CoMP"; 3GPP TSP RAN WG1 #70bis; R1-124364; Sep. 29, 2012; 6 pages.

Samsung; "Views on Signalling Requirement for Reduced Power ABS"; 3GPP TSG-RAN2#77Bis Meeting; R2-121848; Mar. 21, 2012; 4 pages.

Samsung, "Further discussion on downlink power allocation for CoMP", 3GPP TSG-RAN WG1#70 meeting, R1-123478, Aug. 13-17, 2012, pp. 1-4.

* cited by examiner

FIG. 8

| PQI FIELD VALUE | CORRESPONDING PARAMETER SET |
|---|---|
| '00' | FIRST PARAMETER SET CONFIGURED BY HIGHER LAYER |
| '01' | SECOND PARAMETER SET CONFIGURED BY HIGHER LAYER |
| '10' | THIRD PARAMETER SET CONFIGURED BY HIGHER LAYER |
| '11' | FOURTH PARAMETER SET CONFIGURED BY HIGHER LAYER |

FIG. 9

| NUMBER OF CRS ANTENNA PORTS | $P_B$ | $\rho_B/\rho_A$ |
|---|---|---|
| 0 | 0-4 | — |
| 1 | 0 | 1 |
| | 1 | 4/5 |
| | 2 | 3/5 |
| | 3 | 2/5 |
| 2 OR 4 | 0 | 5/4 |
| | 1 | 1 |
| | 2 | 3/4 |
| | 3 | 1/2 |

FIG. 10

| NUMBER OF CRS ANTENNA PORTS | non-MBSFN SUBFRAME | |
|---|---|---|
| | INDEX OF OFDM SYMBOL WITHIN SLOT, IN WHICH RATIO BETWEEN CORRESPONDING PDSCH EPRE AND CRS EPRE IS REPRESENTED AS $\rho_A$ | INDEX OF OFDM SYMBOL WITHIN SLOT, IN WHICH RATIO BETWEEN CORRESPONDING PDSCH EPRE AND CRS EPRE IS REPRESENTED AS $\rho_B$ |
| 0 | 0, 1, 2, 3, 5, 6 | — |
| 1 OR 2 | 1, 2, 3, 5, 6 | 0, 4 |
| 4 | 2, 3, 5, 6 | 0, 1, 4 |

FIG. 11

| NUMBER OF CRS ANTENNA PORTS | MBSFN SUBFRAME | | | |
|---|---|---|---|---|
| | INDEX OF OFDM SYMBOL WITHIN SLOT, IN WHICH RATIO BETWEEN CORRESPONDING PDSCH EPRE AND CRS EPRE IS REPRESENTED AS $\rho_A$ | | INDEX OF OFDM SYMBOL WITHIN SLOT, IN WHICH RATIO BETWEEN CORRESPONDING PDSCH EPRE AND CRS EPRE IS REPRESENTED AS $\rho_B$ | |
| | $n_s \bmod 2 = 0$ | $n_s \bmod 2 = 1$ | $n_s \bmod 2 = 0$ | $n_s \bmod 2 = 1$ |
| 0 | 0, 1, 2, 3, 4, 5, 6 | 0, 1, 2, 3, 4, 5, 6 | — | — |
| 1 OR 2 | 1, 2, 3, 4, 5, 6 | 0, 1, 2, 3, 4, 5, 6 | 0 | — |
| 4 | 2, 3, 4, 5, 6 | 0, 1, 2, 3, 4, 5, 6 | 0, 1 | — |

TERMINAL APPARATUS, BASE STATION APPARATUS, INTEGRATED CIRCUIT, AND COMMUNICATION METHOD

TECHNICAL FIELD

The present invention relates to a terminal apparatus, a base station apparatus, an integrated circuit, and a communication method.

The present application claims priority to Japanese Patent Application No. 2013-145348 filed in the Japanese Patent Office on Jul. 11, 2013, the disclosure of which is herein incorporated by reference in its entirety.

BACKGROUND ART

A cellular mobile communication wireless access system and a wireless network (hereinafter, referred to as "Long Term Evolution (LTE)" or "Evolved Universal Terrestrial Radio Access (EUTRA)") have been examined in the 3rd Generation Partnership Project (3GPP). In the LTE system, a base station apparatus is also referred to as evolved NodeB (eNodeB) and a terminal apparatus is also referred to as user equipment (UE). The LTE system is a cellular communication system in which a plurality of coverage areas of the base station apparatus is arranged in a cell shape. A single base station apparatus may manage a plurality of cells.

The base station apparatus transmits data to the terminal apparatus using a physical downlink shared channel (PDSCH). In the 3GPP, the support for coordinated multipoint transmission and reception (CoMP) which is a technology in which a plurality of base station apparatuses (cells, transmission points, or reception points) is coordinated with each other to perform interference coordination has been examined. The base station apparatus can transmit a single PDSCH to the terminal apparatus by using one of the plurality of coordinated transmission points. The base station apparatus can transmit a single PDSCH to the terminal apparatus by using the plurality of coordinated transmission points.

NPL 1 describes a technology of controlling the transmission power of a PDSCH for each transmission point in the CoMP. In NPL 1, a parameter (PB) related to the transmission power of the PDSCH is correlated with a DMRS virtual cell ID. NPL 1 describes that the parameter (PB) corresponds to a power boosting level for a cell-specific reference signal (CRS).

CITATION LIST

Non Patent Document

[NON PATENT DOCUMENT 1] "Further discussion on downlink power allocation for CoMP", R1-123478, 3GPP TSG-RAN WG1 Meeting #70, 13-17 Aug. 2012.

DISCLOSURE OF THE INVENTION

Problems to be Solved by the Invention

For example, in the technology described in NPL 1, there is a problem that it is difficult to control a power of a PDSCH for each OFDM symbol in each transmission point. An aspect of the present invention is to provide a terminal apparatus, a base station apparatus, an integrated circuit, and a communication method which are capable of efficiently performing communication using a downlink physical channel.

Means for Solving the Problems (1) In order to achieve the aforementioned object, the present invention provides the following means. That is, according to a first aspect of the present invention, there is provided a terminal apparatus that communicates with a base station apparatus. The terminal apparatus includes: a reception unit that receives first information indicating a subframe in which a cell-specific reference signal (CRS) is present, and second information which indicates a subframe other than a subframe indicated as the subframe in which the CRS is present by the first information, as a multicast broadcast single frequency network (MBSFN) subframe.

(2) According to a second aspect of the present invention, in the terminal apparatus described in the first aspect, the reception unit may receive third information which indicates the number of CRS antenna ports and is used to determine a resource element to which a physical downlink control channel (PDSCH) is mapped, and in the subframe other than the subframe indicated as the subframe in which the CRS is present by the first information, a resource element to which a PDSCH transmitted through an antenna port different from a CRS antenna port for a serving cell is mapped may be based on whether or not the subframe other than the subframe indicated as the subframe in which the CRS is present by the first information is indicated as the MBSFN subframe by the second information and the number of CRS antenna ports indicated by the third information corresponding to the PDSCH.

(3) According to a third aspect of the present invention, in the terminal apparatus described in the second aspect, the reception unit may receive fourth information indicating a third ratio between a first ratio of PDSCH energy per resource element (EPRE) to CRS EPRE of a serving cell and a second ratio of the PDSCH EPRE to the CRS EPRE of the serving cell, and in the subframe other than the subframe indicated as the subframe in which the CRS is present by the first information, an orthogonal frequency division multiplexing (OFDM) symbol corresponding to the first ratio and an OFDM symbol corresponding to the second ratio may be based on whether or not the subframe other than the subframe indicated as the subframe in which the CRS is present by the first information is indicated as the MBSFN subframe by the second information and the number of CRS antenna ports of the serving cell.

(4) According to a fourth aspect of the present invention, in the terminal apparatus described in the second aspect, the reception unit may receive fourth information related to a third ratio between a first ratio of PDSCH energy per resource element (EPRE) to CRS EPRE of a serving cell and a second ratio of the PDSCH EPRE to the CRS EPRE of the serving cell, and in the subframe other than the subframe indicated as the subframe in which the CRS is present by the first information, an orthogonal frequency division multiplexing (OFDM) symbol corresponding to the first ratio and an OFDM symbol corresponding to the second ratio may be based on whether or not the subframe other than the subframe indicated as the subframe in which the CRS is present by the first information is indicated as the MBSFN subframe by the second information and the number of CRS antenna ports indicated by the third information corresponding to the PDSCH.

(5) According to a fifth aspect of the present invention, there is provided a communication method used in a terminal apparatus that communicates with a base station apparatus. The communication method includes: receiving first information indicating a subframe in which a cell-specific reference signal (CRS) is present, and second information which indicates a subframe other than a subframe indicated as the subframe in which the CRS is present by the first information, as a multicast broadcast single frequency network (MBSFN) subframe.

(6) According to a sixth aspect of the present invention, the communication method described in the fifth aspect may further include: receiving third information which indicates the number of CRS antenna ports and is used to determine a resource element to which a physical downlink control channel (PDSCH) is mapped. In the subframe other than the subframe indicated as the subframe in which the CRS is present by the first information, a resource element to which a PDSCH transmitted through an antenna port different from a CRS antenna port for a serving cell is mapped may be based on whether or not the subframe other than the subframe indicated as the subframe in which the CRS is present by the first information is indicated as the MBSFN subframe by the second information and the number of CRS antenna ports indicated by the third information corresponding to the PDSCH.

(7) According to a seventh aspect of the present invention, the communication method described in the sixth aspect may further include: receiving fourth information indicating a third ratio between a first ratio of PDSCH energy per resource element (EPRE) to CRS EPRE of a serving cell and a second ratio of the PDSCH EPRE to the CRS EPRE of the serving cell. In the subframe other than the subframe indicated as the subframe in which the CRS is present by the first information, an orthogonal frequency division multiplexing (OFDM) symbol corresponding to the first ratio and an OFDM symbol corresponding to the second ratio may be based on whether or not the subframe other than the subframe indicated as the subframe in which the CRS is present by the first information is indicated as the MBSFN subframe by the second information and the number of CRS antenna ports of the serving cell.

(8) According to an eighth aspect of the present invention, the communication method described in the sixth aspect may further include: receiving fourth information related to a third ratio between a first ratio of PDSCH energy per resource element (EPRE) to CRS EPRE of a serving cell and a second ratio of the PDSCH EPRE to the CRS EPRE of the serving cell. In the subframe other than the subframe indicated as the subframe in which the CRS is present by the first information, an orthogonal frequency division multiplexing (OFDM) symbol corresponding to the first ratio and an OFDM symbol corresponding to the second ratio may be based on whether or not the subframe other than the subframe indicated as the subframe in which the CRS is present by the first information is indicated as the MBSFN subframe by the second information and the number of CRS antenna ports indicated by the third information corresponding to the PDSCH.

(9) According to a ninth aspect of the present invention, there is provided an integrated circuit used in a terminal apparatus that communicates with a base station apparatus. The integrated circuit causes the terminal apparatus to exhibit a series of functions including a function of receiving first information indicating a subframe in which a cell-specific reference signal (CRS) is present, and second information which indicates a subframe other than a subframe indicated as the subframe in which the CRS is present by the first information, as a multicast broadcast single frequency network (MBSFN) subframe.

(10) According to a tenth aspect of the present invention, in the integrated circuit described in the ninth aspect, the integrated circuit may cause the terminal apparatus to exhibit a function of receiving third information which indicates the number of CRS antenna ports and is used to determine a resource element to which a physical downlink control channel (PDSCH) is mapped, and in the subframe other than the subframe indicated as the subframe in which the CRS is present by the first information, a resource element to which a PDSCH transmitted through an antenna port different from a CRS antenna port for a serving cell is mapped may be based on whether or not the subframe other than the subframe indicated as the subframe in which the CRS is present by the first information is indicated as the MBSFN subframe by the second information and the number of CRS antenna ports indicated by the third information corresponding to the PDSCH.

(11) According to an eleventh aspect of the present invention, in the integrated circuit described in the tenth aspect, the integrated circuit may cause the terminal apparatus to exhibit a function of receiving fourth information indicating a third ratio between a first ratio of PDSCH energy per resource element (EPRE) to CRS EPRE of a serving cell and a second ratio of the PDSCH EPRE to the CRS EPRE of the serving cell, and in the subframe other than the subframe indicated as the subframe in which the CRS is present by the first information, an orthogonal frequency division multiplexing (OFDM) symbol corresponding to the first ratio and an OFDM symbol corresponding to the second ratio may be based on whether or not the subframe other than the subframe indicated as the subframe in which the CRS is present by the first information is indicated as the MBSFN subframe by the second information and the number of CRS antenna ports of the serving cell.

(12) According to a twelfth aspect of the present invention, in the integrated circuit described in the tenth aspect, the integrated circuit may cause the terminal apparatus to exhibit a function of receiving fourth information related to a third ratio between a first ratio of PDSCH energy per resource element (EPRE) to CRS EPRE of a serving cell and a second ratio of the PDSCH EPRE to the CRS EPRE of the serving cell, and in the subframe other than the subframe indicated as the subframe in which the CRS is present by the first information, an orthogonal frequency division multiplexing (OFDM) symbol corresponding to the first ratio and an OFDM symbol corresponding to the second ratio may be based on whether or not the subframe other than the subframe indicated as the subframe in which the CRS is present by the first information is indicated as the MBSFN subframe by the second information and the number of CRS antenna ports indicated by the third information corresponding to the PDSCH.

(13) According to a thirteenth aspect of the present invention, there is provided a base station apparatus that communicates with a terminal apparatus. The terminal apparatus includes: a transmission unit that transmits first information indicating a subframe in which a cell-specific reference signal (CRS) is present, and second information which indicates a subframe other than a subframe indicated as the subframe in which the CRS is present by the first information, as a multicast broadcast single frequency network (MBSFN) subframe.

(14) According to a fourteenth aspect of the present invention, in the base station apparatus described in the thirteenth aspect, the transmission unit may transmit third information which indicates the number of CRS antenna ports and is used to determine a resource element to which a physical downlink control channel (PDSCH) is mapped, and in the subframe other than the subframe indicated as the subframe in which the CRS is present by the first information, a resource element to which a PDSCH transmitted through an antenna port different from a CRS antenna port for a serving cell is mapped may be based on whether or not the subframe other than the subframe indicated as the subframe in which the CRS is present by the first information is indicated as the MBSFN subframe by the second information and the number of CRS antenna ports indicated by the third information corresponding to the PDSCH.

(15) According to a fifteenth aspect of the present invention, in the base station apparatus described in the fourteenth aspect, the transmission unit may transmit fourth information indicating a third ratio between a first ratio of PDSCH energy per resource element (EPRE) to CRS EPRE of a serving cell and a second ratio of the PDSCH EPRE to the CRS EPRE of the serving cell, and in the subframe other than the subframe indicated as the subframe in which the CRS is present by the first information, an orthogonal frequency division multiplexing (OFDM) symbol corresponding to the first ratio and an OFDM symbol corresponding to the second ratio may be based on whether or not the subframe other than the subframe indicated as the subframe in which the CRS is present by the first information is indicated as the MBSFN subframe by the second information and the number of CRS antenna ports of the serving cell.

(16) According to a sixteenth aspect of the present invention, in the base station apparatus described in the fourteenth aspect, the transmission unit may transmit fourth information related to a third ratio between a first ratio of PDSCH energy per resource element (EPRE) to CRS EPRE of a serving cell and a second ratio of the PDSCH EPRE to the CRS EPRE of the serving cell, and in the subframe other than the subframe indicated as the subframe in which the CRS is present by the first information, an orthogonal frequency division multiplexing (OFDM) symbol corresponding to the first ratio and an OFDM symbol corresponding to the second ratio may be based on whether or not the subframe other than the subframe indicated as the subframe in which the CRS is present by the first information is indicated as the MBSFN subframe by the second information and the number of CRS antenna ports indicated by the third information corresponding to the PDSCH.

(17) According to a seventeenth aspect of the present invention, there is a provided a communication method used in a base station apparatus that communicates with a terminal apparatus. The communication method includes: transmitting first information indicating a subframe in which a cell-specific reference signal (CRS) is present, and second information which indicates a subframe other than a subframe indicated as the subframe in which the CRS is present by the first information, as a multicast broadcast single frequency network (MBSFN) subframe.

(18) According to an eighteenth aspect of the present invention, the communication method described in the seventeenth aspect may further include: transmitting third information which indicates the number of CRS antenna ports and is used to determine a resource element to which a physical downlink control channel (PDSCH) is mapped. In the subframe other than the subframe indicated as the subframe in which the CRS is present by the first information, a resource element to which a PDSCH transmitted through an antenna port different from a CRS antenna port for a serving cell is mapped may be based on whether or not the subframe other than the subframe indicated as the subframe in which the CRS is present by the first information is indicated as the MBSFN subframe by the second information and the number of CRS antenna ports indicated by the third information corresponding to the PDSCH.

(19) According to a nineteenth aspect of the present invention, the communication method described in the eighteenth aspect may further include: transmitting fourth information indicating a third ratio between a first ratio of PDSCH energy per resource element (EPRE) to CRS EPRE of a serving cell and a second ratio of the PDSCH EPRE to the CRS EPRE of the serving cell. In the subframe other than the subframe indicated as the subframe in which the CRS is present by the first information, an orthogonal frequency division multiplexing (OFDM) symbol corresponding to the first ratio and an OFDM symbol corresponding to the second ratio may be based on whether or not the subframe other than the subframe indicated as the subframe in which the CRS is present by the first information is indicated as the MBSFN subframe by the second information and the number of CRS antenna ports of the serving cell.

(20) According to a twentieth aspect of the present invention, the communication method described in the eighteenth aspect may further include: transmitting fourth information related to a third ratio between a first ratio of PDSCH energy per resource element (EPRE) to CRS EPRE of a serving cell and a second ratio of the PDSCH EPRE to the CRS EPRE of the serving cell. In the subframe other than the subframe indicated as the subframe in which the CRS is present by the first information, an orthogonal frequency division multiplexing (OFDM) symbol corresponding to the first ratio and an OFDM symbol corresponding to the second ratio may be based on whether or not the subframe other than the subframe indicated as the subframe in which the CRS is present by the first information is indicated as the MBSFN subframe by the second information and the number of CRS antenna ports indicated by the third information corresponding to the PDSCH.

(21) According to a twenty-first aspect of the present invention, there is provided an integrated circuit used in a terminal apparatus that communicates with a base station apparatus. The integrated circuit causes the base station apparatus to exhibit a series of functions including a function of transmitting first information indicating a subframe in which a cell-specific reference signal (CRS) is present, and second information which indicates a subframe other than a subframe indicated as the subframe in which the CRS is present by the first information, as a multicast broadcast single frequency network (MBSFN) subframe.

(22) According to a twenty-second aspect of the present invention, in the integrated circuit described in the twenty-first aspect, the integrated circuit may cause the base station apparatus to exhibit a function of transmitting third information which indicates the number of CRS antenna ports and is used to determine a resource element to which a physical downlink control channel (PDSCH) is mapped, and in the subframe other than the subframe indicated as the subframe in which the CRS is present by the first information, a resource element to which a PDSCH transmitted through an antenna port different from a CRS antenna port for a serving cell is mapped may be based on whether or not the subframe other than the subframe indicated as the subframe in which the CRS is present by the first information is indicated as the MBSFN subframe by the second information and the number of CRS antenna ports indicated by the third information corresponding to the PDSCH.

(23) According to a twenty-third aspect of the present invention, in the integrated circuit described in the twenty-second aspect, the integrated circuit may cause the base station apparatus to exhibit a function of transmitting fourth information indicating a third ratio between a first ratio of PDSCH energy per resource element (EPRE) to CRS EPRE of a serving cell and a second ratio of the PDSCH EPRE to the CRS EPRE of the serving cell, and in the subframe other than the subframe indicated as the subframe in which the CRS is present by the first information, an orthogonal frequency division multiplexing (OFDM) symbol corresponding to the first ratio and an OFDM symbol corresponding to the second ratio may be based on whether or not the subframe other than the subframe indicated as the subframe in which the CRS is present by the first information is indicated as the MBSFN subframe by the second information and the number of CRS antenna ports of the serving cell.

(24) According to a twenty-fourth aspect of the present invention, in the integrated circuit described in the twenty-second aspect, the integrated circuit may cause the base station apparatus to exhibit a function of transmitting fourth information related to a third ratio between a first ratio of PDSCH energy per resource element (EPRE) to CRS EPRE of a serving cell and a second ratio of the PDSCH EPRE to the CRS EPRE of the serving cell, and in the subframe other than the subframe indicated as the subframe in which the CRS is present by the first information, an orthogonal frequency division multiplexing (OFDM) symbol corresponding to the first ratio and an OFDM symbol corresponding to the second ratio may be based on whether or not the subframe other than the subframe indicated as the subframe in which the CRS is present by the first information is indicated as the MBSFN subframe by the second information and the number of CRS antenna ports indicated by the third information corresponding to the PDSCH.

Effects of the Invention

According to the aspect of the present invention, a terminal apparatus and a base station apparatus can efficiently communicate using a downlink physical channel.

BRIEF DESCRIPTION OF THE DRAWINGS

FIG. 8 is a table showing the correspondence of a parameter set with a value of a PQI field according to the present embodiment.

FIG. 9 is a table showing a third ratio ($\rho_B/\rho_A$) according to the present embodiment.

FIG. 10 is a table showing an OFDM symbol index within the slot of the non-MBSFN subframe, in which a ratio of corresponding PDSCH EPRE to CRS EPRE of a serving cell is expressed by $\rho_A$ or $\rho_B$ according to the present embodiment.

FIG. 11 is a table showing an OFDM symbol index within the slot of the MBSFN subframe, in which a ratio of corresponding PDSCH EPRE to CRS EPRE of a serving cell is expressed by $\rho_A$ or $\rho_B$ according to the present embodiment.

MODE FOR CARRYING OUT THE INVENTION

Hereinafter, an embodiment of the present invention will be described.

In the present embodiment, a plurality of cells is configured for a terminal apparatus. A technology in which the terminal apparatus performs communication through the plurality of cells is referred to as cell aggregation or carrier aggregation. The present invention may be applied to each of the plurality of cells configured for the terminal apparatus. The present invention may be applied to some of the plurality of configured cells. The cell configured for the terminal apparatus is also referred to as serving cell.

The plurality of configured serving cells includes one primary cell, and one secondary cell or a plurality of secondary cells. The primary cell is a serving cell in which an initial connection establishment procedure is performed, a serving cell in which a connection re-establishment procedure is started, or a cell indicated as the primary cell in a handover procedure. The secondary cell may be configured at a point of time when RRC connection is established or after the RRC connection is established.

In the case of the cell aggregation, a TDD (Time Division Duplex) system or a FDD (Frequency Division Duplex) system may be applied to all the plurality of cells. In the case of the cell aggregation, cells to which the TDD system is applied and cells to which the FDD system is applied may be aggregated. In the present embodiment, although it will be described that the cells to which the FDD is applied are used, the present invention may be applied to the cells to which the TDD is applied.

Figure 1:
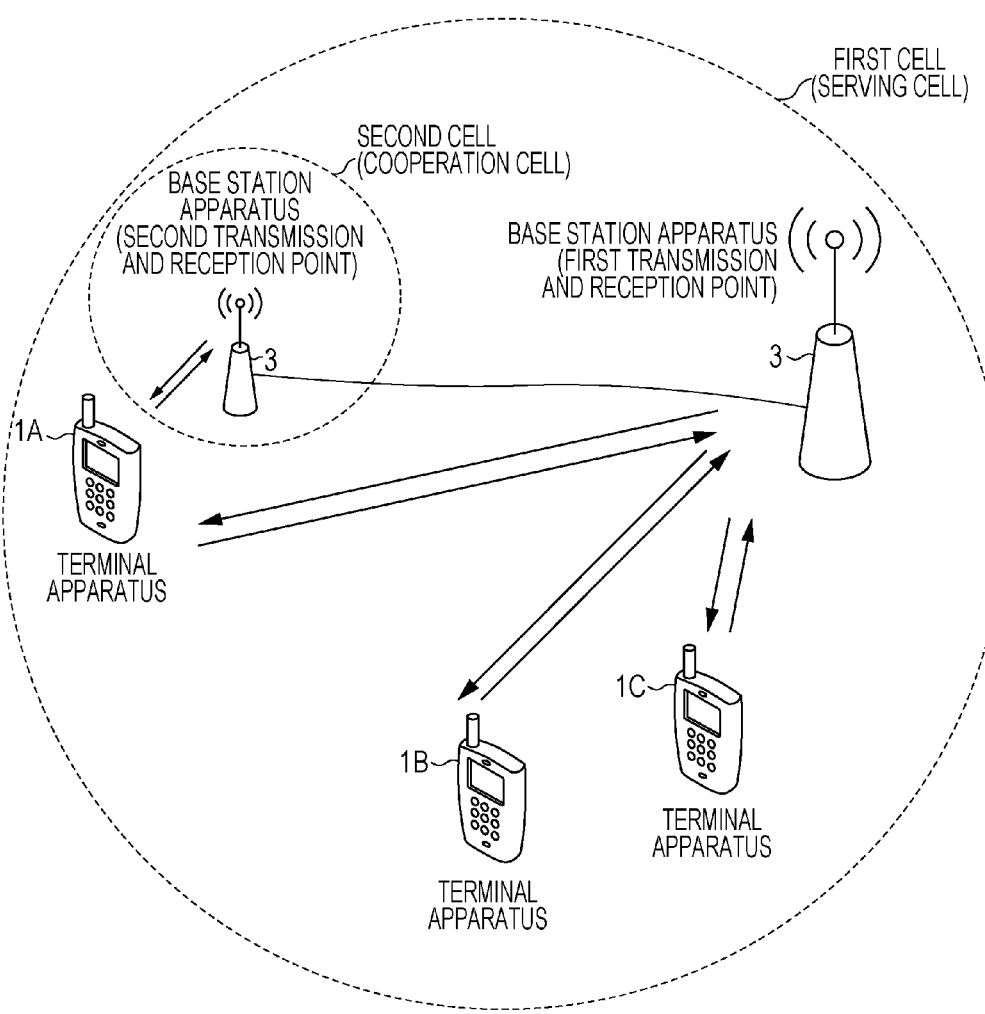
FIG. 1 is a conceptual diagram of a wireless communication system according to the present embodiment.

FIG. 1 is a conceptual diagram showing a wireless communication system according to the present embodiment. In FIG. 1, the wireless communication system includes terminal apparatuses 1A to 1C, and a base station apparatus 3. Hereinafter, the terminal apparatuses 1A to 1C are referred to as the terminal apparatus 1. In FIG. 1, the base station apparatus 3 includes a first transmission and reception point, and a second transmission and reception point. The base station apparatus 3 can transmit a signal in the first transmission and reception point and/or the second transmission and reception point. The base station apparatus 3 can receive a signal in the first transmission and reception point and/or the second transmission and reception point.

An area covered by the first transmission point is referred to as a first cell. An area covered by the second transmission point is referred to as a second cell. In FIG. 1, the first cell is a serving cell and the second cell is a coordinated cell for the terminal apparatuses 1A to 1C. The serving cell is non-transparent for the terminal apparatus 1. The coordinated cell may be transparent for the terminal apparatus 1. The first cell may be a coordinated cell, and the second cell may be a serving cell for the terminal apparatus 1. The first cell and the second cell are constructed in the same frequency band.

Physical channels and physical signals according to the present embodiment will be described.

A downlink physical channel and a downlink physical signal are collectively referred to as downlink signals. An uplink physical channel and an uplink physical signal are collectively referred to as uplink signal. The downlink physical channel and the uplink physical channel are collectively referred to as physical channel. The downlink physical signal and the uplink physical signal are collectively referred to as physical signal. The physical channel is used to transmit information output from a higher layer. The physical signal is not used to transmit the information output from the higher layer, but is used by a physical layer.

In FIG. 1, in uplink wireless communication from the terminal apparatus 1 to the base station apparatus 3, the following uplink physical channels are used.

Physical uplink control channel (PUCCH)
Physical uplink shared channel (PUSCH)
Physical random access channel (PRACH)

The PUCCH is a physical channel used to transmit uplink control information (UCI). The uplink control information includes channel state information (CSI) of a downlink, a scheduling request (SR) indicating a request for a PUSCH resource, and acknowledgement (ACK) and negative-acknowledgement ACK (NACK) in response to downlink data (TB: transport block, DL-SCH: Downlink-Shared channel). The ACK/NACK is referred to as HARQ-ACK or HARQ feedback.

The PUSCH is a physical channel used to transmit uplink data (UL-SCH: Uplink-Shared Channel) and/or the HARQ-ACK and/or the channel state information.

The PRACH is a physical channel used to transmit a random access preamble. The PRACH is used in an initial connection establishment procedure, a handover procedure, and a connection re-establishment procedure.

In FIG. 1, in the uplink wireless communication, the following uplink physical signals are used.

Uplink reference signal (UL RS)

In the present embodiment, the following two types of uplink reference signals are used.

Demodulation reference signal (DMRS)
Sounding reference signal (SRS)

The DMRS is related to the transmission of the PUSCH or the PUCCH. The DMRS is time-multiplexed with the PUSCH or the PUCCH. The base station apparatus 3 uses the DMRS in order to correct the channel of the PUSCH or the PUCCH. Hereinafter, the simultaneous transmission of the PUSCH and the DMRS is simply referred to as the transmission of the PUSCH. Hereinafter, the simultaneous transmission of the PUCCH and the DMRS is simply referred to as the transmission of the PUCCH. The SRS is not related to the transmission of the PUSCH or the PUCCH. The base station apparatus 3 uses the SRS in order to measure a channel state of the uplink.

In FIG. 1, in downlink wireless communication from the base station apparatus 3 to the terminal apparatus 1, the following downlink physical channels are used.

Physical broadcast channel (PBCH)
Physical control format indicator channel (PCFICH)
Physical hybrid automatic repeat request indicator channel (PHICH)
Physical downlink control channel (PDCCH)
Enhanced physical downlink control channel (EPDCCH)
PDSCH (Physical Downlink Shared channel)
Physical multicast channel (PMCH)

The PBCH is used to broadcast a master information block (MIB, broadcast channel (BCH)) which is shared by the terminal apparatuses 1. The MIB is transmitted at an interval of 40 ms. The MIB is repeatedly transmitted with a period of 10 ms. For example, the MIB includes information indicating SFN. The SFN (System Frame Number) is a radio frame number. The MIB is system information.

The PCFICH is used to transmit information indicating a region (OFDM symbols) which is used to transmit the PDCCH.

The PHICH is used to transmit a HARQ indicator (HARQ feedback) which indicates acknowledgement (ACK) or negative acknowledgement (NACK) of uplink data (uplink shared channel: UL-SCH) received by the base station apparatus 3.

The PDCCH and the EPDCCH are used to transmit downlink control information (DCI). The downlink control information is referred to as a DCI format. The downlink control information includes a downlink grant and an uplink grant. The downlink grant is referred to as downlink assignment or downlink allocation.

The uplink grant is used to schedule a single PUSCH in a single cell. The uplink grant is used to schedule a single PUSCH in a given subframe.

The downlink grant is used to schedule a single PDSCH in a single cell. The downlink grant is used to schedule the PDSCH in the same subframe as a subframe in which the downlink grant is transmitted. The downlink grant includes a DCT format 1A and a DCI format 2D. The DCI format 1A does not include a PQI (PDSCH RE Mapping and Quasi-Co-Location Indicator) field. The DCI format 2D include the PQI field.

The terminal apparatus 1 set in transmission mode 10 monitors the PDCCH and/or the EPDCCH for the DCI format 1A and the DCI format 2D. The monitoring means that the decoding (receiving or detecting) of the PDCCH and/or the EPDCCH according to all the monitored DCI formats is tried. The transmission mode is controlled for each serving cell by the base station apparatus 3. The terminal apparatus 3 sets the transmission mode to the serving cell based on a higher layer signal received from the base station apparatus 3. That is, the base station apparatus 3 sets the transmission mode to the terminal apparatus 1 by using the higher layer signal.

A cyclic redundancy check (CRC) parity bit is added to the DCI format. The CRC parity bit is scrambled by a cell-radio network temporary identifier (C-RNTI) or a semi persistent scheduling cell-radio network temporary identifier (SPS C-RNTI). The C-RNTI and the SPS C-RNTI are identifiers for identifying the terminal apparatuses 1 in the cell. The C-RNTI is used to control resources of the PDSCH or resources of the PUSCH in a single subframe. The SPS C-RNTI is used to periodically allocate the resources of the PDSCH or PUSCH.

The PDSCH is used to transmit downlink data (downlink shared channel: DL-SCH).

The PMCH is used to transmit multicast data (multicast channel: MCH).

In FIG. 1, in the downlink wireless communication, the following downlink physical signals are used.

Synchronization signal (SS)

Downlink reference signal (DL RS)

The synchronization signals are used to allow the terminal apparatus 1 to be synchronized in the frequency domain and the time domain of the downlink. In the FDD system, the synchronization signals are arranged in subframes 0 and 5 of the radio frame.

The downlink reference signal is used to correct the channel of the downlink physical channel by the terminal apparatus 1. The downlink reference signal is used to calculate the channel state information of the downlink by the terminal apparatus 1. The downlink reference signal is used to measure a geographic location of the terminal apparatus by the terminal apparatus 1.

In the present embodiment, the following five types of downlink reference signals are used.

Cell-specific reference signal (CRS)

UE-specific reference signal (URS) related to PDSCH

Demodulation reference signal (DMRS) related to EPD-CCH

Non-zero power channel state information-reference signal (NZP CSI-RS)

Zero power channel state information-reference signal (ZP CSI-RS)

Multimedia broadcast and multicast service over single frequency network reference signal (MBSFN RS)

The CRS is transmitted in all bands of the subframe. The CRS is used to demodulate the PBCH/PDCCH/PHICH/PCFICH/and the PDSCH. The CRS may be used to calculate the channel state information of the downlink by the terminal apparatus 1. The PBCH/PDCCH/PHICH/and the PCFICH are transmitted through an antenna port which is used to transmit the CRS.

The CRS of the serving cell is transmitted in the same set as that of the antenna port used to transmit the PBCH of the serving cell (first transmission point). The PBCH is transmitted in antenna ports {0}, {0, 1} or {0, 1, 2, 3}. Hereinafter, the antenna ports {0}, {0, 1} and {0, 1, 2, 3} are referred to as a cell specific antenna port, a CRS antenna port, or an antenna port 0-3. Particularly, the antenna port used to transmit the PBCH of the serving cell and the CRS of the serving cell is referred to as a CRS antenna port for the serving cell, a CRS antenna port in the serving cell, or a CRS antenna port of the serving cell.

The URS related to the PDSCH is transmitted in a subframe and a band that are used to transmit the PDSCH to which the URS is related. The URS is used to demodulate the PDSCH to which the URS is related. The PDSCH is transmitted through the antenna port used to transmit the CRS or the antenna port used to transmit the URS. The URS is transmitted through one antenna port or a plurality of antenna ports {7, 8, . . . , 14}. Hereinafter, one antenna port or the plurality of antenna ports {7, 8, . . . , 14} is referred to as a URS antenna port or antenna ports 7 to 14.

The URS related to the PDSCH and the PDSCH transmitted through the URS antenna port may be transparent for the terminal apparatus 1. That is, it is difficult for the terminal apparatus 1 to specify the serving cell or the coordinated cell in which the URS related to the PDSCH and the PDSCH transmitted through the URS antenna port are transmitted. The terminal apparatus 1 may not specify the transmission point in which the URS related to the PDSCH and the PDSCH transmitted through the URS antenna port are transmitted. The URS transmitted in the first transmission point, the second transmission point, the serving cell or the coordinated cell and the URS antenna port through which the URS is transmitted are respectively referred to as an URS in the serving cell and an URS antenna port in the serving cell. The PDSCH transmitted through the URS antenna port in the first transmission point, the second transmission point, the serving cell or the coordinated cell is also referred to as an URS antenna port for the serving cell, a PDSCH in the serving cell, and a PDSCH of the serving cell.

The DMRS related to the EPDCCH is transmitted in a subframe and a band that are used to transmit the EPDCCH to which the DMRS is related. The DMRS is used to demodulate the EPDCCH to which the DMRS is related. The EPDCCH is transmitted through an antenna port which is used to transmit the DMRS.

The NZP CSI-RS is transmitted in the configured subframe. Resources in which the NZP CSI-RS is transmitted are configured by the base station apparatus 3. The NZP CSI-RS is used to calculate the channel state information of the downlink by the terminal apparatus 1. The terminal apparatus 1 performs signal measurement (channel measurement) by using the NZP CSI-RS.

The resources of the ZP CSI-RS are configured by the base station apparatus 3. The base station apparatus 3 transmits the ZP CSI-RS with zero output. That is, the base station apparatus 3 does not transmit the ZP CSI-RS. The base station apparatus 3 does not transmit the PDSCH and the EPDCCH in the configured resources of the ZP CSI-RS. For example, the terminal apparatus 1 can measure interference in resources corresponding to the NZP CSI-RS in a given cell.

The MBSFN RS is transmitted in all bands of the subframe used to transmit the PMCH. The MBSFN RS is used to demodulate the PMCH. The PMCH is transmitted through an antenna port that is used to transmit the MBSFN RS.

The BCH, the MCH, the UL-SCH, and the DL-SCH are transport channels. The channel which is used in a medium access control (MAC) layer is referred to as a transport channel. The unit of data in the transport channel used in the MAC layer is also referred to as a transport block (TB) or a MAC protocol data unit (PDU). Hybrid automatic repeat request (HARQ) control is performed for each transport block in the MAC layer. The transport block is the unit of data which is transmitted (delivered) by the MAC layer to the physical layer. In the physical layer, the transport block is mapped to a code word and a coding process is performed for each code word.

Hereinafter, the structure of the radio frame of present embodiment will be described.

Figure 2:
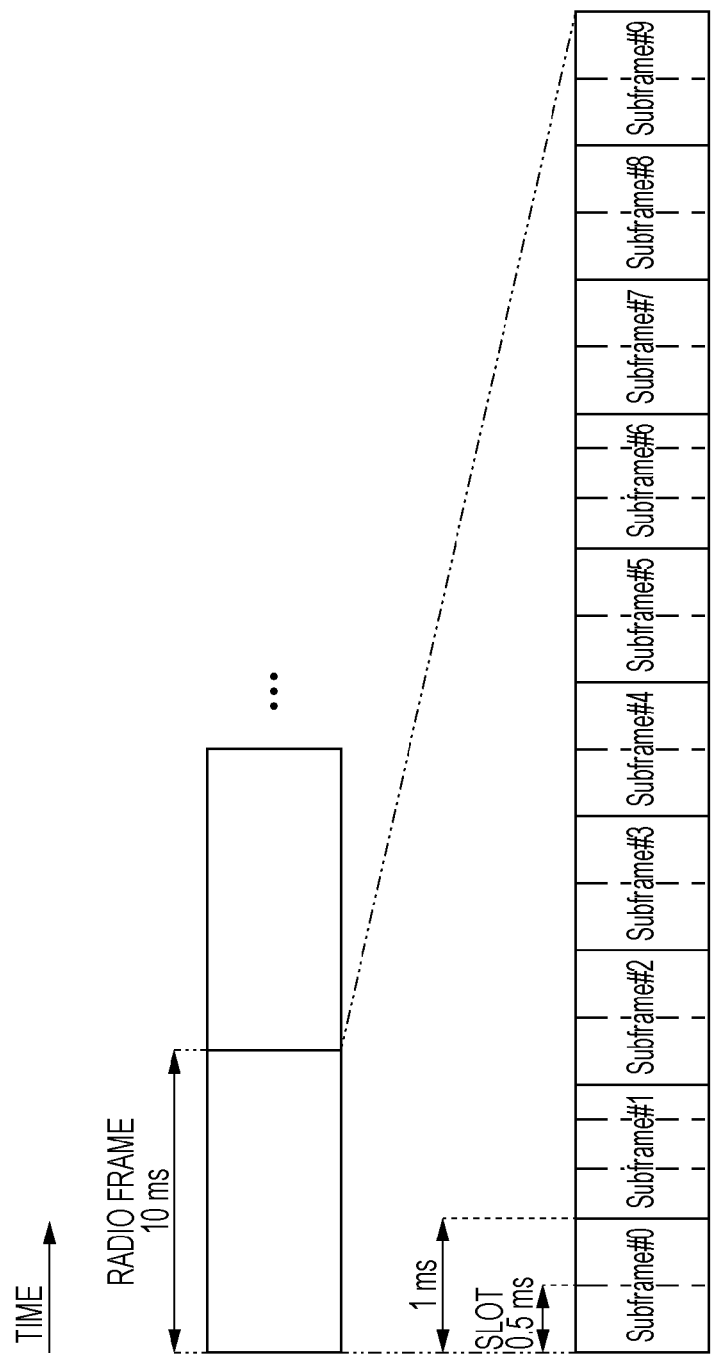
FIG. 2 is a diagram showing a schematic structure of a radio frame according to the present embodiment.

FIG. 2 is a diagram showing a schematic structure of the radio frame according to the present embodiment. Each radio frame has a length of 10 ms. In FIG. 2, a horizontal axis represents a time axis, and is defined by 10 subframes. Each subframe has a length of 1 ms, and is defined by two consecutive slots. Each slot has a length of 0.5 ms. An i-th subframe in the radio frame includes a (2×i)-th slot and a (2×i+1)-th slot.

Hereinafter, the structure of the slot according to the present embodiment will be described.

Figure 3:
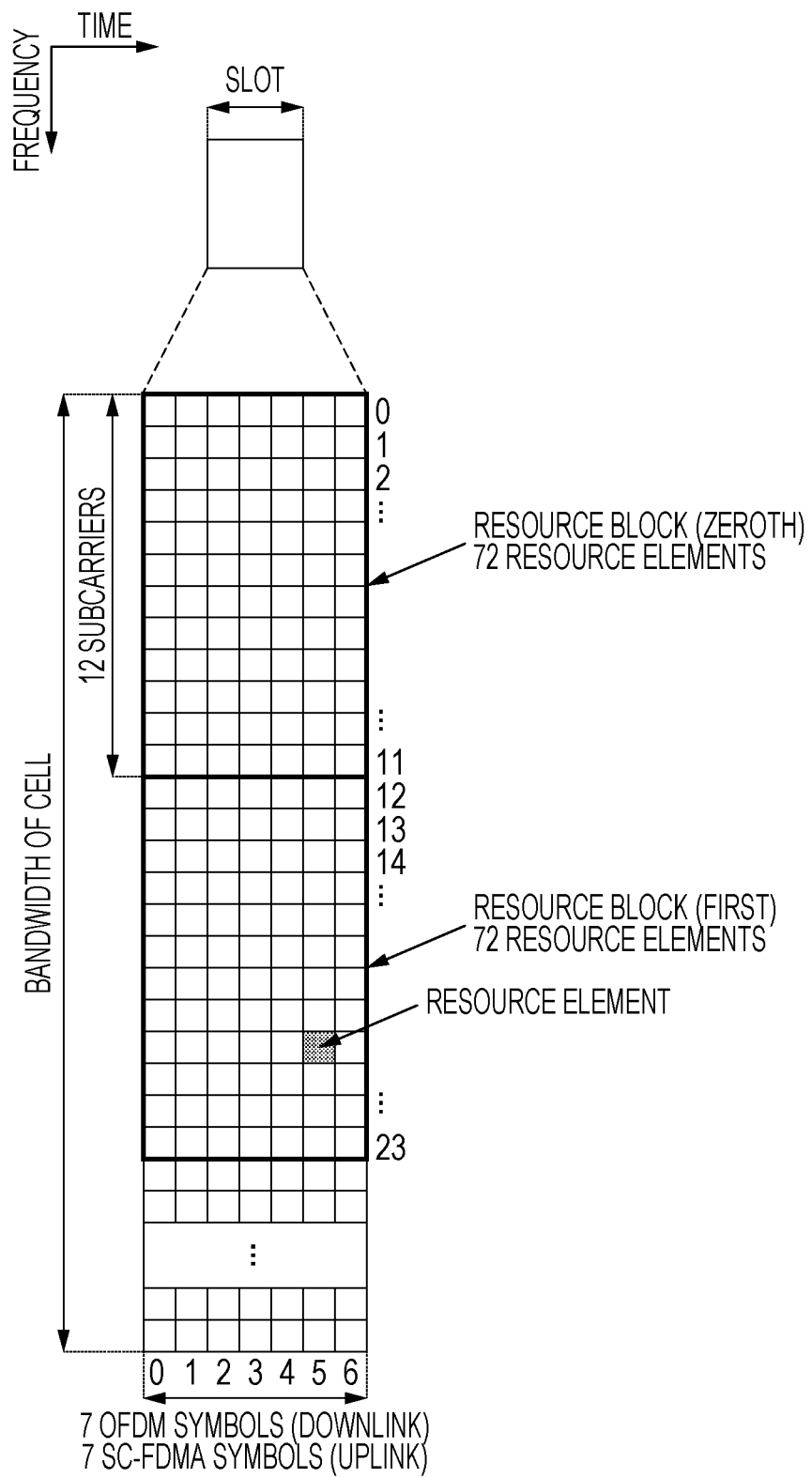
FIG. 3 is a diagram showing the structure of a slot according to the present embodiment.

FIG. 3 is a diagram showing the structure of the slot according to the present embodiment. In the present embodiment, a normal cyclic prefix (CP) is applied to OFDM symbols. An extended CP may be applied to the OFDM symbols. The physical signals or the physical channels transmitted in the respective slots are represented by resource grids. In FIG. 3, a horizontal axis represents a time axis, and a vertical axis represents a frequency axis. In the downlink, a resource grid is defined by a plurality of subcarriers and a plurality of OFDM symbols. In the uplink, a resource grid is defined by a plurality of subcarriers and a plurality of SC-FDMA symbols. The number of subcarriers constituting one slot depends on a bandwidth of the cell. The number of OFDM symbols or SC-FDMA symbols constituting one slot is seven. Each element in the resource grid is referred to as a resource element. The resource element is identified using a subcarrier number and an OFDM symbol number or a SC-FDMA symbol number.

The resource block is used to represent the mapping of a given physical channel (for example, the PDSCH or the PUSCH) to the resource element. For the resource block, a virtual resource block and a physical resource block are defined. Initially, a given physical channel is mapped to the virtual resource block. Thereafter, the virtual resource block is mapped to the physical resource block. One physical resource block is defined by 7 consecutive OFDM symbols or SC-FDMA symbols in the time domain and 12 consecutive subcarriers in the frequency domain. Therefore, one physical resource block includes (7×12) resource elements. In addition, one physical resource block corresponds to one slot in the time domain and corresponds to 180 kHz in the frequency domain. The physical resource block is numbered from 0 in the frequency domain.

Hereinafter, the physical channels and the physical signals which are transmitted in each subframe will be described.

Figure 4:
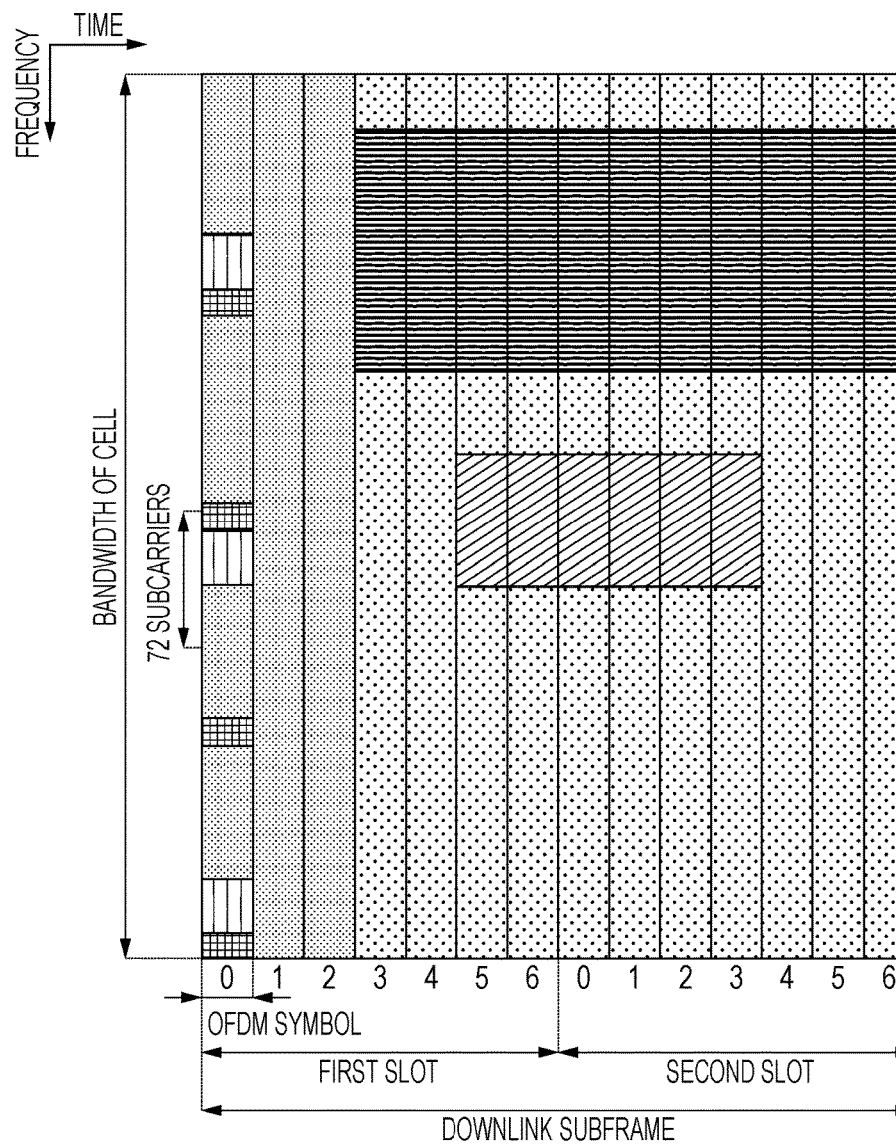
FIG. 4 is a diagram showing an example of the arrangement of physical channels and physical signals in a subframe of a downlink according to the present embodiment.

FIG. 4 is a diagram showing an example of the arrangement of the physical channels and the physical signals in the downlink subframe according to the present embodiment. In FIG. 4, a horizontal axis represents a time axis, and a vertical axis represents a frequency axis. The base station apparatus 3 may transmit the downlink physical channels (PBCH, PCFICH, PHICH, PDCCH, EPDCCH and PDSCH) and the downlink physical signals (synchronization signals and downlink reference signals) in the downlink subframe. The PBCH is transmitted in only the subframe 0 of the radio frame. For the sake of convenience in description, the downlink reference signals are not shown in FIG. 4. The arrangement of the CRSs and the URSs will be described below.

In a PDCCH region, frequency multiplexing and time multiplexing may be performed on a plurality of PDCCHs. In an EPDCCH region, frequency multiplexing, time multiplexing, and spatial multiplexing may be performed on a plurality of EPDCCHs. In a PDSCH region, frequency multiplexing and spatial multiplexing may be performed on a plurality of PDSCHs. Time multiplexing may be performed on the PDCCH and the PDSCH or the EPDCCH. Frequency multiplexing may be performed on the PDSCH and the EPDCCH.

The downlink subframe includes a multicast broadcast single frequency network (MBSFN) subframe, and a non-MBSFN subframe. The PMCH is transmitted in only the MBSFN subframe. The PBCH, PCFICH, PHICH, PDCCH, EPDCCH and PDSCH are transmitted in the MBSFN subframe and the non-MBSFN subframe. The PMCH and the PDSCH are not simultaneously transmitted in one MBSFN subframe in a given serving cell.

The base station apparatus 3 transmits a higher layer signal including information indicating the MBSFN subframe and the non-MBSFN subframe in the serving cell to the terminal apparatus 1. The terminal apparatus 1 sets parameter mbsfn-SubframeConfigList indicating the MBSFN subframe and the non-MBSFN subframe in the serving cell based on the higher layer signal received from the base station apparatus 3. That is, the base station apparatus 3 sets the parameter mbsfn-SubframeConfigList indicating the MBSFN subframe and the non-MBSFN subframe in the serving cell to the terminal apparatus 1 by using the higher layer signal.

Here, the terminal apparatus 1 may regard a subframe that is not indicated as the MBSFN subframe by the parameter mbsfn-SubframeConfigList as the non-MBSFN subframe. For example, the parameter of mbsfn-SubframeConfigList may not indicate the subframe 0 and the subframe 5 as the MBSFN subframe. That is, the subframe 0 and the subframe 5 may be constantly the non-MB SFN subframe.

Figure 5:
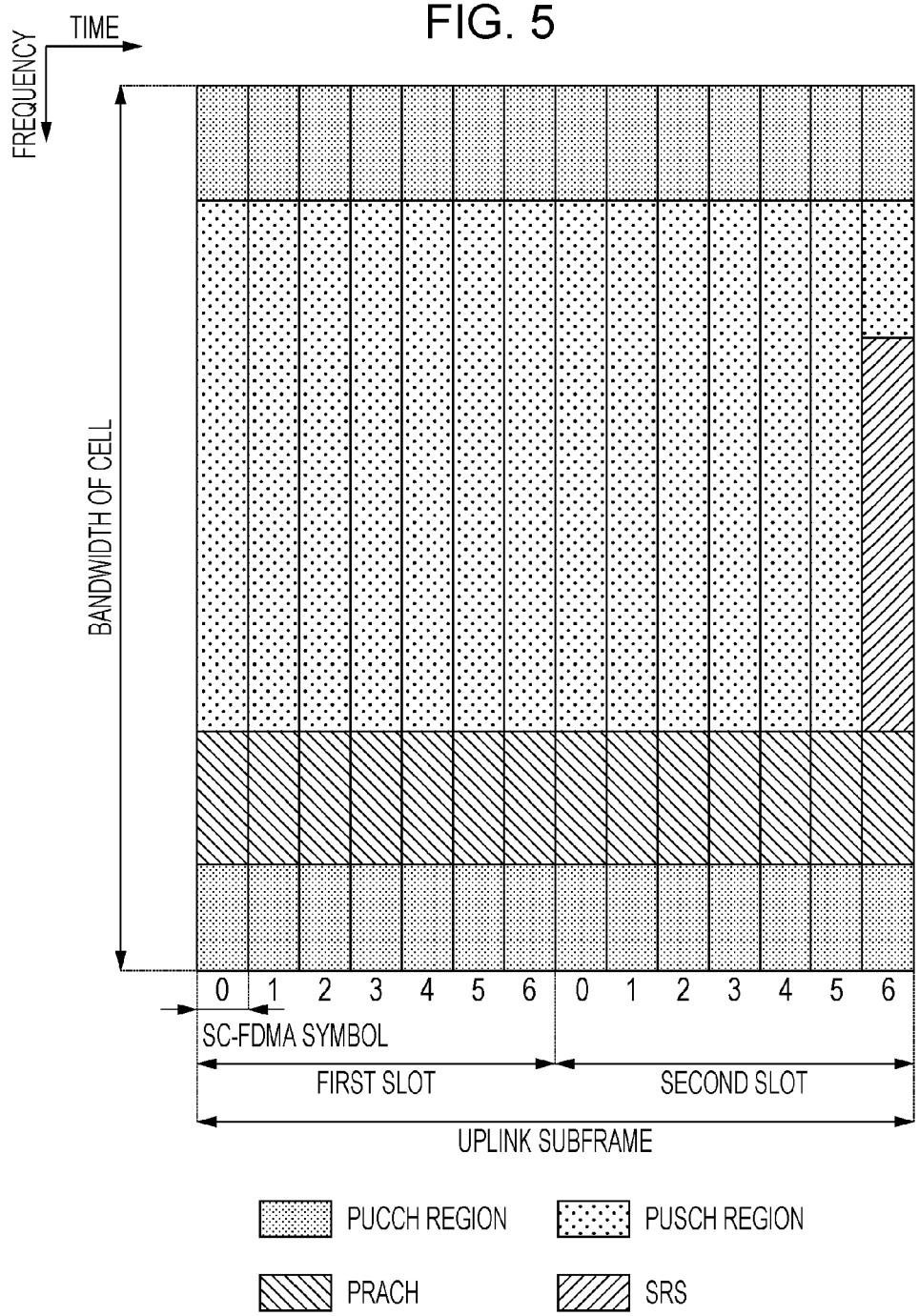
FIG. 5 is a diagram showing an example of the arrangement of physical channels and physical signals in a subframe of an uplink according to the present embodiment.

FIG. 5 is a diagram showing an example of the arrangement of the physical channels and the physical signals in the uplink subframe according to the present embodiment. In FIG. 5, a horizontal axis is a time axis, and a vertical axis is a frequency axis. The terminal apparatus 1 may transmit the uplink physical channels (PUCCH, PUSCH and PRACH) and the uplink physical signals (DMRS and SRS) in the uplink subframe. In a PUCCH region, frequency multiplexing, time multiplexing and code multiplexing are performed on a plurality of PUCCHs. In a PUSCH region, frequency multiplexing and spatial multiplexing may be performed on a plurality of PUSCHs. Frequency multiplexing may be performed on the PUCCH and the PUSCH. The PRACHs may be arranged in a single subframe or over two subframes. Code multiplexing may be performed on the plurality of PRACHs.

The SRS is transmitted using the last SC-FDMA symbol in the uplink subframe. That is, the SRS is arranged in the last SC-FDMA symbol of the uplink subframe. The DMRS is time-multiplexed with the PUCCH or the PUSCH. For simplicity of illustration, the DMRS is not shown in FIG. 5.

Hereinafter, the arrangement of the CRSs and the URSs will be described.

Figure 6:
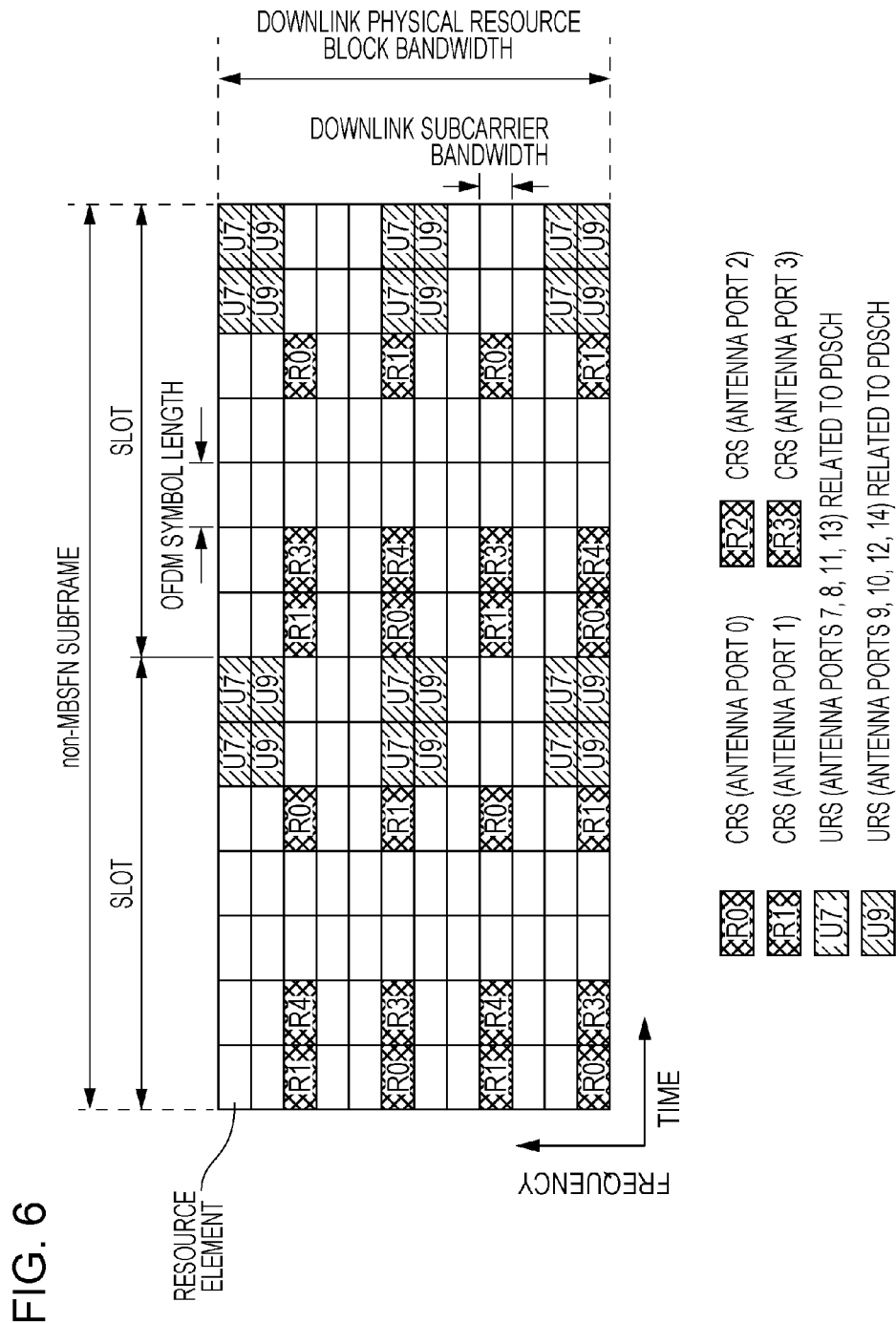
FIG. 6 is a diagram showing the arrangement of CRSs and URSs in a non-MBSFN subframe according to the present embodiment.
Figure 7:
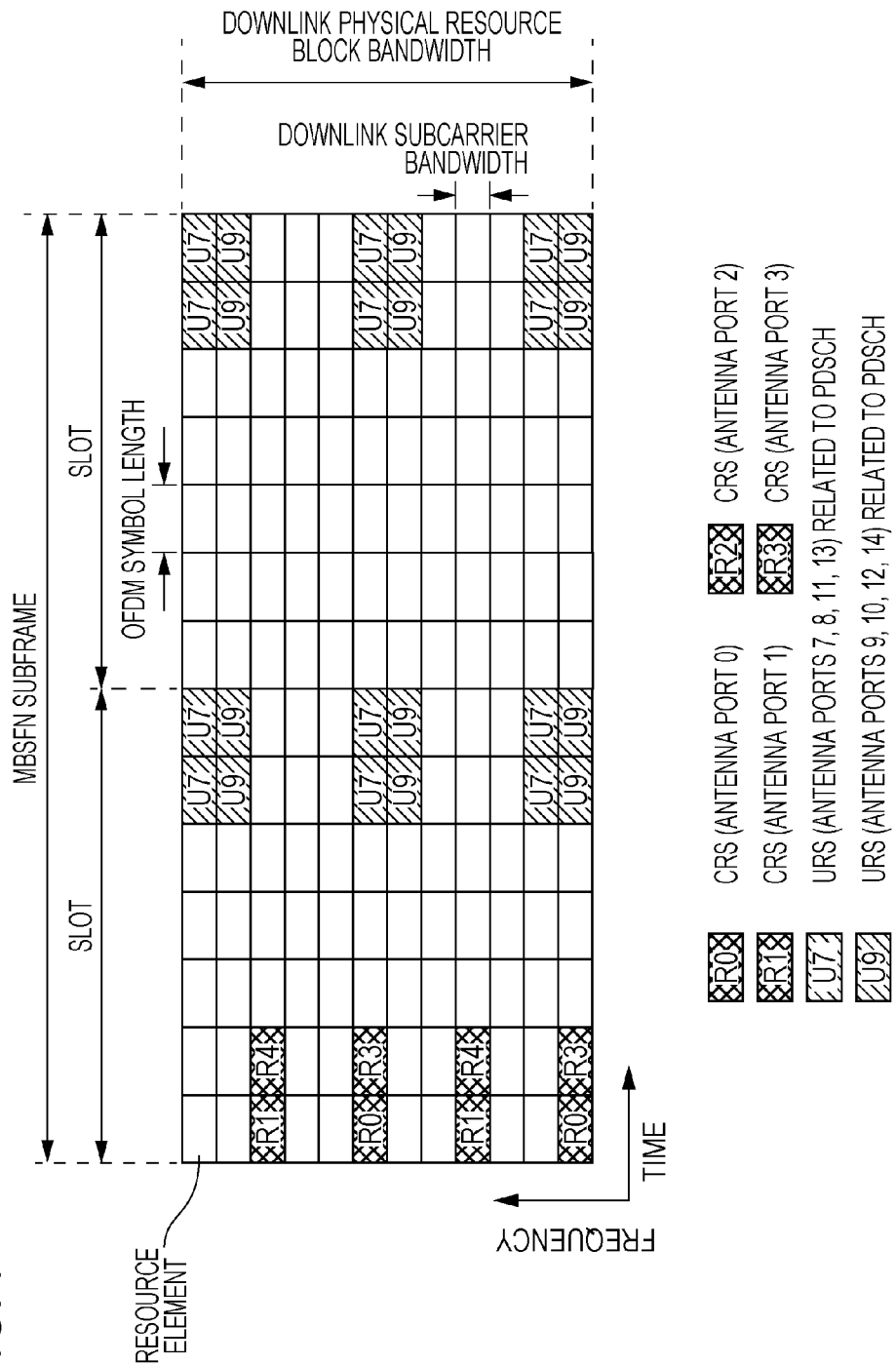
FIG. 7 is a diagram showing the arrangement of CRSs and URSs in a MBSFN subframe according to the present embodiment.

FIG. 6 is a diagram showing the arrangement of the CRSs and the URSs in the non-MBSFN subframe according to the present embodiment. FIG. 7 is a diagram showing the arrangement of the CRSs and the URSs in the MBSFN subframe according to the present embodiment. In FIGS. 6 and 7, a horizontal axis represents a time axis, and a vertical axis represents a frequency axis. In FIGS. 6 and 7, one subframe is shown in the time domain, and a bandwidth of one physical resource block is shown in the frequency domain. FIGS. 6 and 7 show examples in a case where the number of CRS antenna ports is 4 and the number of URS antenna ports is 8.

In FIGS. 6 and 7, squares to which Ri (i=0, 1, 2 and 3) is assigned indicate resource elements to which the CRSs transmitted through the CRS antenna port i are mapped. In FIGS. 6 and 7, squares to which U7 is assigned indicate resource elements to which the URSs transmitted through URS antenna ports {7, 8, 11 13} are mapped, and squares to which U9 is assigned indicate resource elements to which the URSs transmitted through URS antenna ports {9, 10, 12, 14} are mapped. The code multiplexing is performed on the URSs transmitted through the URS antenna ports {7, 8, 11, 13}. The code multiplexing is performed on the URSs transmitted through the URS antenna ports {9, 10, 12, 14}.

In FIGS. 6 and 7, the PDSCHs may be transmitted in resource elements to which the CRSs and the URSs are not mapped. In FIGS. 6 and 7, in a case where the CRS antenna port is {0}, the PDSCHs may be transmitted in the resource elements to which the R1, R2 and R3 are assigned. In FIGS. 6 and 7, in a case where the CRS antenna port is {0, 1}, the PDSCHs may be transmitted in the resource elements to which the R2 and R3 are assigned. In FIGS. 6 and 7, in a case where the URS antenna port is {7}, {8} or {7, 8}, the PDSCHs may be transmitted in the resource elements to which the U9 is assigned.

The CRSs may not be present in a part or all of the subframes of a given serving cell. The base station apparatus 3 may control whether or not to transmit the CRSs in the subframe. The base station apparatus 3 may transmit information/parameter noCRS-SubframeConfig-r12 indicating subframes (subframe sets) in which the CRS is not present to the terminal apparatus 1. The base station apparatus 3 may transmit information/parameter noCRS-servcellConfig-r12 indicating that the CRS is not present in the serving cell to the terminal apparatus 1. The base station apparatus 3 may transmit information/parameter SubframeSetConfig indicating a plurality of subframe sets and information/noCRS-SubframeSetConfig-r12 indicating whether or not the CRS is present in each of the plurality of subframe sets to the terminal apparatus 1. The parameter noCRS-SubframeConfig-r12, the parameter noCRS-servcellConfig-r12, and a set of the parameter SubframeSetConfig-r12 and the parameter noCRS-SubframeSetConfig-r12 is also referred to as parameter noCRS-Config-r12.

A subframe indicated as the serving cell in which the CRS is not present based on the parameter noCRS-Config-r12 is referred to as a noCRS subframe, a subframe in which the CRS is not transmitted, or a subframe in which the CRS is not present. A subframe other than the noCRS subframe is referred to as a CRS subframe, a subframe in which the CRS is transmitted, or a subframe in which the CRS is present. In FIGS. 6 and 7, in the subframe in which the CRS is not present, the PDSCHs may be transmitted in the resource elements to which the R0, R1, R2 and R3 are assigned.

The resource elements to which the CRSs are mapped may be shifted in the frequency domain. The shift in the frequency domain is referred to as frequency shift. In FIGS. 6 and 7, the shift in the frequency domain is 0. A value of the frequency shift of the CRS for the serving cell is determined based on a physical layer cell identity (PCI) for the serving cell. That is, the position of the CRS in a given subframe is determined based on the number of CRS antenna ports, a value of the frequency shift, whether or not the subframe is indicated as the MBSFN subframe, and/or whether or not the subframe is indicated as the subframe in which the CRS is not present.

In the resource block in which the URS is not transmitted, the PDSCH is transmitted through the CRS antenna port. In the resource block in which the URS is transmitted, the PDSCH is transmitted through the URS antenna port. In a case where the PDSCH is transmitted in the MBSFN subframe, the PDSCH is transmitted through the URS antenna port. In a case where the PDSCH is transmitted in the noCRS subframe, the PDSCH is transmitted through the URS antenna port.

For example, in a case where the PDSCH is addressed to the terminal apparatus 1 set in the transmission mode 10, is scheduled by the DCI format 1A to which the CRC parity bit scrambled by the C-RNTI is added and is transmitted in the non-MBSFN subframe, the PDSCH is transmitted through the CRS antenna port. Here, the non-MBSFN subframe is the CRS subframe.

For example, in a case where the PDSCH is addressed to the terminal apparatus 1 set in the transmission mode 10, is scheduled by the DCI format 1A to which the CRC parity bit scrambled by the C-RNTI is added, and is transmitted in the MBSFN subframe, the PDSCH is transmitted through the URS antenna port.

For example, in a case where the PDSCH is addressed to the terminal apparatus 1 set in the transmission mode 10 and is scheduled by the DCI format 2D to which the CRC parity bit scrambled by the C-RNTI is added, the PDSCH is transmitted through the URS antenna port.

For example, in a case where the PDSCH is addressed to the terminal apparatus 1 set in the transmission mode 10 and is scheduled by the DCI formats (the DCI format 1A and the DCI format 2D) to which the CRC parity bit scrambled by the SPS C-RNTI is added, the PDSCH is transmitted through the URS antenna port.

For example, in a case where the PDSCH is addressed to the terminal apparatus 1 set in the transmission mode 10 and is transmitted in the subframe in which the CRS is not present, the PDSCH is transmitted through the URS antenna port. Here, the PDSCH is scheduled by the DCI formats (the DCI format 1A and the DCI format 2D) to which the parity bit scrambled by the SPS C-RNTI or the C-RNTI is added in the MBSFN subframe or the non-MB SFN subframe.

Hereinafter, a method for mapping the PDSCH to the resource element will be described.

The base station apparatus 3 transmits a higher layer signal including information indicating one or a plurality of parameter sets for determining the resource element to which the PDSCH is mapped to the terminal apparatus 1. The terminal apparatus 1 sets the plurality of parameter sets for determining the resource element to which the PDSCH is mapped, based on the higher layer signal received from the base station apparatus 3. That is, the base station apparatus 3 sets the plurality of parameter sets for determining the resource element to which the PDSCH is mapped to the terminal apparatus 1 by using the higher layer signal. The base station apparatus 3 sets at least one parameter set to the terminal apparatus 1 set in the transmission mode 10. That is, at least one parameter is set to the terminal apparatus 1 set in the transmission mode 10. One parameter set or a plurality of parameter sets may be individually set to each of the serving cells.

The parameter set for determining the resource element to which the PDSCH is mapped includes parameter mbsfn-SubframeConfigList-r11, parameter crs-PortsCount-r11 and parameter crs-FreqShift-r11. The parameter mbsfn-SubframeConfigList-r11 indicates the MBSFN subframe and the non-MBSFN subframe. The parameter crs-PortsCount-r11 indicates the number of CRS antenna ports. The parameter crs-FreqShift-r11 indicates the value of the frequency shift with respect to the CRS.

The parameter mbsfn-SubframeConfigList and the parameter mbsfn-SubframeConfigList-r11 may be individually set. That is, the configuration of the MBSFN subframe for the serving cell which is indicated by the parameter mbsfn-SubframeConfigList and the configuration of the MBSFN subframe which is indicated by the parameter mbsfn-SubframeConfigList-r11 and is used to determine the resource element to which the PDSCH is mapped may be different, or may be the same.

Here, the terminal apparatus 1 may regard the subframe that is not indicated as the MBSFN subframe by the parameter mbsfn-SubframeConfigList-r11 as the non-MB SFN subframe. For example, the parameter mbsfn-SubframeConfigList-r11 may not indicate the subframe 0 and the subframe 5 as the MBSFN subframe. That is, the subframe 0 and the subframe 5 may be constantly the non-MB SFN subframe.

The parameter crs-PortsCount-r11 may be set independently of the number of CRS antenna ports of the serving cell. That is, the number of CRS antenna ports indicated by the parameter crs-PortsCount-r11 may be different from or the same as the number of CRS antenna ports for the serving cell. The parameter crs-PortsCount-r11 indicates 0, 1, 2, or 4.

The parameter crs-FreqShift-r11 may be set independently of the value of the frequency shift for the CRS of the serving cell. That is, the value of the frequency shift for the CRS indicated by the parameter crs-FreqShift-r11 may be different from or the same as the value of the frequency shift for the CRS of the serving cell.

For example, the parameter mbsfn-SubframeConfigList-r11, the parameter crs-PortsCount-r11 and the parameter crs-FreqShift-r11 included in a given parameter set may be related to a position of the CRS for the serving cell. For example, the parameter mbsfn-SubframeConfigList-r11, the parameter crs-PortsCount-r11 and the parameter crs-FreqShift-r11 included in a given parameter set may be related to a position of the CRS for the coordinated cell.

The terminal apparatus 1 set in the transmission mode 10 for a given serving cell uses a parameter set which is scheduled by the DCI format 2D to which the CRC parity bit scrambled by the C-RNTI is added and corresponds to a value of the PQI field included in the DCI format 2D in order to determine the resource element to which the PDSCH related to the serving cell is mapped. An information bit indicating a value corresponding to one parameter set is mapped to the PQI field.

The terminal apparatus 1 set in the transmission mode 10 for a given serving cell uses a parameter set which is not accompanied by the corresponding PDCCH/EPDCCH and corresponds to a value of the PQI field included in the DCI format 2D corresponding to SPS activation in order to determine the resource element to which the PDSCH related to the serving cell is mapped. The PDSCH by which the corresponding PDCCH/EPDCCH is not accompanied includes PDSCHs which are periodically allocated using the DCI format (the DCI format 1A and the DCI format 2D) to which the CRC parity bit scrambled by the SPS C-RNTI is added.

FIG. 8 is a table showing the correspondence of the value of the PQI field with the parameter set according to the present embodiment. In FIG. 8, 4 or less parameter sets are set to the terminal apparatus 1. For example, a value '00' of the PQI field corresponds to a first parameter set.

The terminal apparatus 1 set in the transmission mode 10 for a given serving cell uses a first parameter set in the table of FIG. 8 which is scheduled by the DCI format 1A to which the CRC parity bit scrambled by the C-RNTI is added, is transmitted through the URS antenna port, and is used to determine the resource element to which the PDSCH related to the serving cell is mapped.

The terminal apparatus 1 set in the transmission mode 10 for a given serving uses a first parameter set in the table of FIG. 8 which is scheduled by the DCI format 1A to which the CRC parity bit scrambled by the SPS C-RNTI is added and is used to determine the resource element to which the PDSCH related to the serving cell is mapped.

The terminal apparatus 1 set in the transmission mode 10 for a given serving cell uses a first parameter set in the table of FIG. 8 which is related to SPS activation indicated by the DCI format 1A, is not accompanied by the PDCCH/EPDCCH, and is used to determine the resource element to which the PDSCH related to the serving cell is mapped.

The terminal apparatus 1 set in the transmission mode 10 for a given serving cell uses a value of the frequency shift which is scheduled by the DCI format 1A to which the CRC parity bit scrambled by the C-RNTI is added, is transmitted through the CRS antenna port, and is determined by the parameter mbsfn-SubframeConfigList, the number of CRS antenna ports for the serving cell and the physical layer cell identity of the serving cell in order to determine the resource element to which the PDSCH related to the serving cell is mapped.

The terminal apparatus 1 set in the transmission mode 10 for a given serving cell may specify the position of the CRS for determining the resource element to which the PDSCH is mapped by using the value of the frequency shift based on the parameter mbsfn-SubframeConfigList, the number of CRS antenna ports for the serving cell and the physical layer cell identity of the serving cell in order to determine the resource element to which the PDSCH transmitted through the CRS antenna port in the serving cell is mapped.

The terminal apparatus 1 set in the transmission mode 10 for a given serving cell may specify the position of the CRS for determining the resource element to which the PDSCH is mapped by using any one of the parameter sets in the table of FIG. 8 in order to determine the resource element to which the PDSCH transmitted through the URS antenna port in the serving cell is mapped.

The PDSCH is not mapped to the resource element used for the URS to which the PDSCH is related.

In a case where the parameter crs-PortsCount-r11 included in the parameter set corresponding to the PDSCH transmitted through the URS antenna port in the subframe in which the CRS is not present has a value of 1 or greater, the terminal apparatus 1 may determine the resource element to which the PDSCH is mapped by assuming the number of CRS antenna ports indicated by the parameter crs-PortsCount-r11.

In the case where the parameter crs-PortsCount-r11 included in the parameter set corresponding to the PDSCH transmitted through the URS antenna port in the subframe in which the CRS is not present has a value of 1 or greater, the terminal apparatus 1 may determine the resource element to which the PDSCH is mapped by assuming that the number of CRS antenna ports is 0 irrespective of the parameter crs-PortsCount-r11.

Accordingly, it is possible to associate the same parameter set with both the PDSCH transmitted in the subframe in which the CRS is present and the PDSCH transmitted in the subframe in which the CRS is not present.

The parameter noCRS-Config-r12 may be included in each of the parameter sets. Here, one parameter Subframe-SetConfig which is shared by the plurality of parameter sets may be set to the terminal apparatus 1, and individual parameters noCRS-SubframeSetConfig-r12 of the parameter sets may be set to the terminal apparatus 1.

The terminal apparatus 1 set in the transmission mode 10 for a given serving cell may use the parameter noCRS-Config-r12 included in the parameter set corresponding to the PDSCH in order to determine the resource element to which the PDSCH transmitted through the URS antenna port in the serving cell is mapped. Accordingly, the base station apparatus 3 can set the parameter noCRS-Config-r12 included in each of the parameter sets to the terminal apparatus 1 by using the higher layer signal depending on whether or not the CRS is actually transmitted in each of the cells (transmission points). In a case where the parameter noCRS-Config-r12 is not set, the terminal apparatus 1 may regard all the subframes as the CRS subframes.

The base station apparatus 3 determines the resource element to which the PDSCH is mapped based on the aforementioned method.

Hereinafter, the transmission power allocation of the downlink in a first embodiment of the present invention will be described.

Downlink power control is expressed by energy per resource element (EPRE) for each resource element. Resource element energy means energy before the cyclic prefix (CP) is inserted. The term "resource element energy" means an average energy over all constellation points for an applied modulation method. The base station apparatus 3 determines downlink transmission energy for each resource element in the serving cell and the coordinated cell.

The base station apparatus 3 sets parameter referenceSignaLPower indicating CRS EPRE of the serving cell to the terminal apparatus 1 by using the higher layer signal. The base station apparatus 3 allow the CRS EPRE to be constant over all the subframes and to be constant over a downlink system bandwidth until different parameters referenceSignaLPower are transmitted. The terminal apparatus 1 allows the CRS EPRE to be constant over all the subframes and to be constant over the downlink system bandwidth until different parameters referenceSignaLPower are received. The base station apparatus 3 may reduce the power of the PDSCH in the OFDM symbol including the CRS in order to boost the power of the CRS. The base station apparatus 3 may individually control the CRS EPRE in the serving cell and the coordinated cell.

A ratio between PDSCH EPRE for each OFDM symbol and CRS EPRE of the serving cell is expressed by $\rho_A$ or $\rho_B$. A ratio, which is expressed by pa, between the PDSCH EPRE for each OFDM symbol and the CRS EPRE of the serving cell is referred to as a first ratio. A ratio, which is expressed by $\rho_B$, between the PDSCH EPRE for each OFDM symbol and the CRS EPRE of the serving cell is referred to as a second ratio. The base station apparatus 3 sets a parameter $P_A$(p-a) used to determine the $\rho_A$ and a parameter $P_B$(p-b) used to determine a third ratio ($\rho_B/\rho_A$) of the second ratio ($\rho_B$) to the first ratio ($\rho_A$) to the terminal apparatus 1 by using the higher layer signal.

In order to demodulate the PDSCH to which QAM modulation is applied and which is transmitted through the CRS antenna port, the terminal apparatus 1 specifies the first ratio ($\rho_A$), the second ratio ($\rho_B$) and the third ratio ($\rho_B/\rho_A$). That is, in a case where the URS is not present in PRB to which the corresponding PDSCH is mapped, in order to demodulate the PDSCH modulated using the QAM, the terminal apparatus 1 specifies the first ratio ($\rho_A$), the second ratio ($\rho_B$) and the third ratio ($\rho_B/\rho_A$).

In a case where the URS is present in the physical resource block to which the PDSCH addressed to the terminal apparatus 1 set in the transmission mode 10 is mapped, in the base station apparatus 3, a ratio of the PDSCH EPRE to the URS EPRE within the OFDM symbol including the URS is 0 dB in a case where the number of transmission layers is equal to or less than 2, and is −3 dB in a case where the number of transmission layers is greater than 2. The URS is transmitted in the OFDM symbol in which the ratio of the corresponding PDSCH EPRE to the CRS EPRE of the serving cell is expressed by $\rho_A$. That is, in order to demodulate the PDSCH transmitted through the URS antenna port, the terminal apparatus 1 needs to specify the third ratio ($\rho_B/\rho_A$). In order to demodulate the PDSCH transmitted through the URS antenna port, the terminal apparatus 1 may not specify the first ratio ($\rho_A$) and the second ratio ($\rho_B$).

FIG. 9 is a table showing the third ratio ($\rho_B/\rho_A$) according to the present embodiment. The third ratio is given based on the parameter PB and the number of CRS antenna ports. The third ratio may not be defined for the subframe in which the CRS is not present. That is, in a case where the number of CRS antennal ports is 0, the third ratio may not be defined. In a case where the PDSCH is transmitted through the CRS antenna port or the URS antenna port in the subframe in which the CRS is present, the terminal apparatus 1 set in the transmission mode 10 regards the number of CRS antenna ports of FIG. 9 as being the number of CRS antenna ports for the serving cell. That is, in the case where the PDSCH is transmitted through the CRS antenna port or the URS antenna port in the subframe in which the CRS is present, the terminal apparatus 1 set in the transmission mode 10 specifies the third ratio ($\rho_B/\rho_A$) based on the number of CRS antenna ports for the serving cell.

In a case where the PDSCH is transmitted through the URS antenna port in the subframe in which the CRS is present, the terminal apparatus 1 set in the transmission mode 10 may regard the number of CRS antenna ports of FIG. 9 as being the number of CRS antenna ports indicated by the parameter crs-PortsCount-r11 corresponding to the PDSCH. That is, in a case where the PDSCH is transmitted through the URS antenna port in the subframe in which the CRS is present, the terminal apparatus 1 set in the transmission mode 10 may specify the third ratio ($\rho_B/\rho_A$) based on the number of CRS antenna ports indicated by the parameter crs-PortsCount-r11 corresponding to the PDSCH. Accordingly, it is possible to efficiently set the transmission power for the transmission of the PDSCH based on the number of CRS antenna ports that is actually used in the coordinated cell (the second transmission point).

FIG. 10 is a table showing an OFDM symbol index within the slot of the non-MBSFN subframe, in which the ratio of the corresponding PDSCH EPRE to the CRS EPRE of the serving cell is expressed by $\rho_A$ or $\rho_B$ in the present embodiment.

FIG. 11 is a table showing an OFDM symbol index within the slot of the MBSFN subframe, in which the ratio of the corresponding PDSCH EPRE to the CRS EPRE of the serving cell is expressed by $\rho_A$ or $\rho_B$ in the present embodiment. $n_s$ indicates a slot number in the radio frame.

In a case where the PDSCH is transmitted through the URS antenna port in the subframe in which the CRS is not present, the terminal apparatus 1 set in the transmission mode 10 may regard the number of CRS antenna ports of the FIGS. 10 and 11 as being 0 irrespective of the number of the CRS antenna ports indicated by the parameter crs-PortsCount-r11 corresponding to the PDSCH and the number of CRS antenna ports for the serving cell.

In the case where the PDSCH is transmitted through the URS antenna port in the subframe in which the CRS is not present, the terminal apparatus 1 set in the transmission mode 10 may determine the number of CRS antenna ports of FIGS. 10 and 11 based on the number of CRS antenna ports indicated by the parameter crs-PortsCount-r11 corresponding to the PDSCH.

In a case where the PDSCH is transmitted through the CRS antenna port or the URS antenna port in the subframe in which the CRS is present and the subframe is indicated as the non-MBSFN subframe by the parameter mbsfn-SubframeConfigList, the terminal apparatus 1 set in the transmission mode 10 specifies the OFDM symbol index within the slot of the subframe, in which the ratio of the corresponding PDSCH EPRE to the CRS EPRE of the serving cell is expressed by $\rho_A$ or $\rho_B$ based on the table of FIG. 10.

In a case where the PDSCH is transmitted through the CRS antenna port or the URS antenna port in the subframe in which the CRS is present and the subframe is indicated as the MBSFN subframe by the parameter mbsfn-Subframe-ConfigList, the terminal apparatus 1 set in the transmission mode 10 specifies the OFDN symbol index within the slot of the subframe, in which the ratio of the corresponding PDSCH EPRE to the CRS EPRE of the serving cell is expressed by $\rho_A$ or $\rho_B$ based on the table of FIG. 11.

Figure 12:
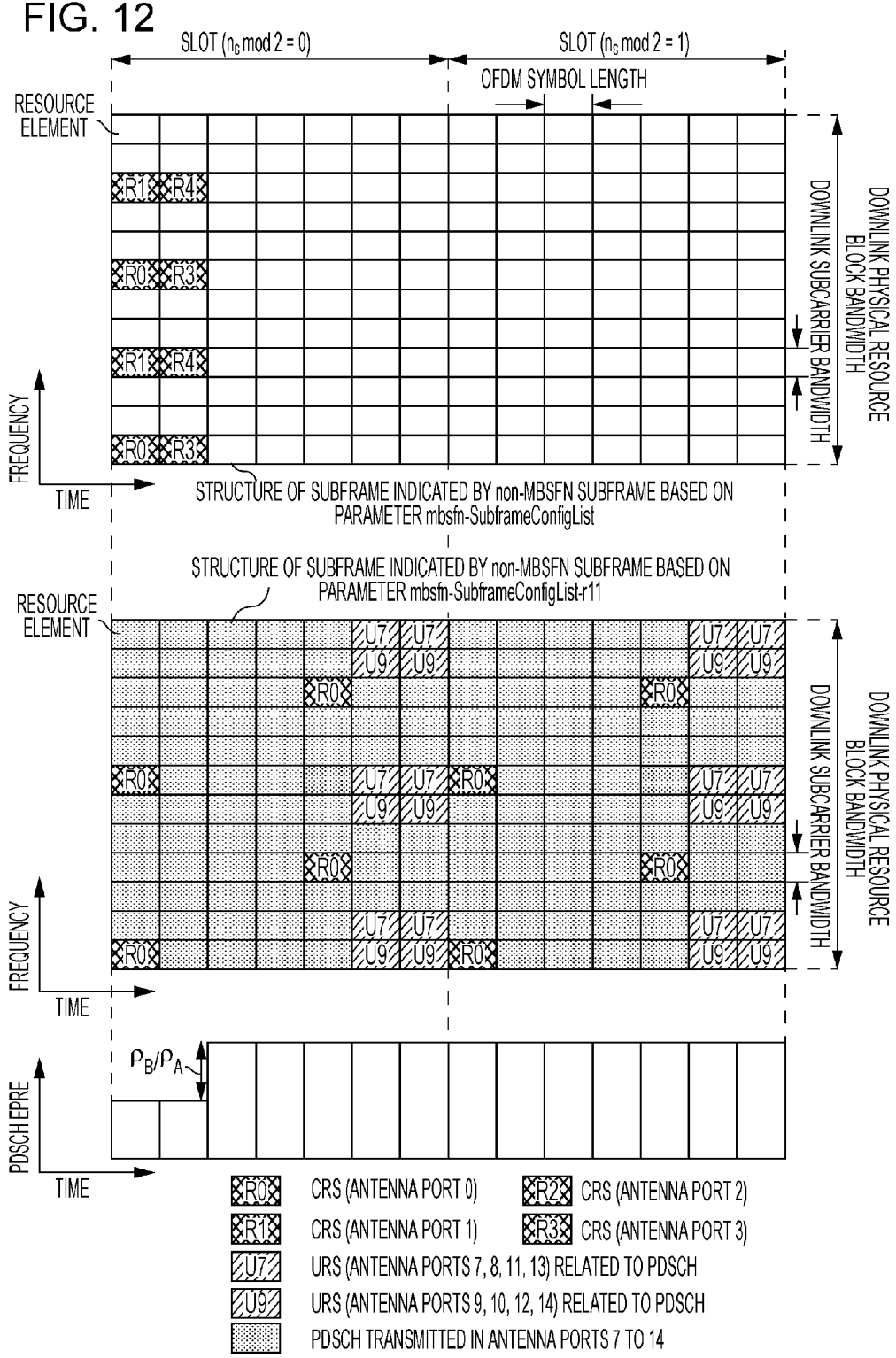
FIG. 12 is a diagram showing an example of the OFDM symbol index corresponding to the $\rho_A$ or $\rho_B$ according to the present embodiment.
Figure 13:
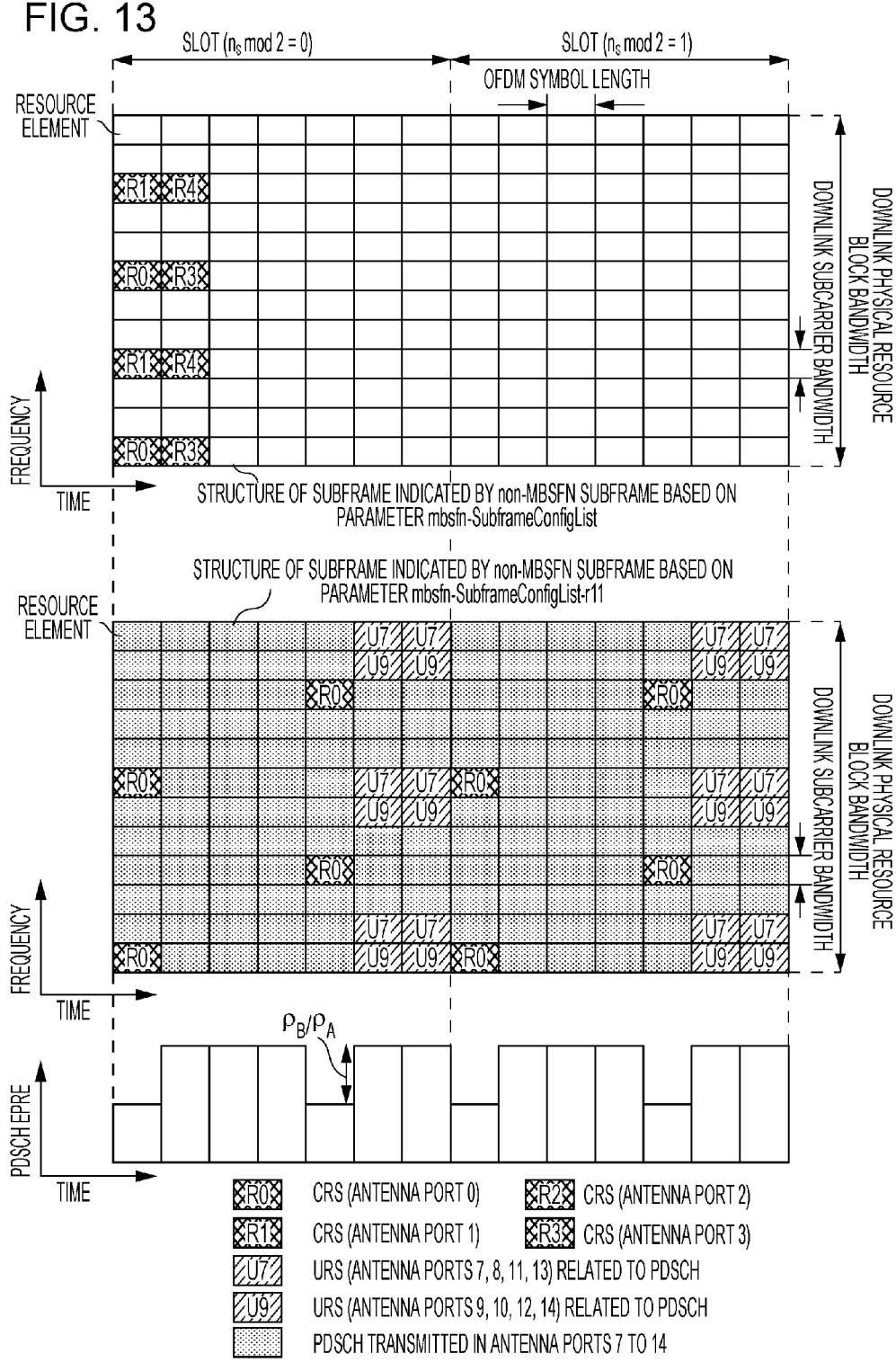
FIG. 13 is a diagram showing another example of the OFDM symbol index corresponding to the $\rho_A$ or $\rho_B$ according to the present embodiment.

FIG. 12 is a diagram showing an example of the OFDM symbol index corresponding to the $\rho_A$ or $\rho_B$ according to the present embodiment. FIG. 13 is a diagram showing another example of the OFDM symbol index corresponding to the $\rho_A$ or $\rho_B$ according to the present embodiment. FIGS. 12 and 13 show one subframe in the time domain and two physical resource blocks expressed by the bandwidth of one downlink physical resource block in the frequency domain.

In FIGS. 12 and 13, the following conditions 1 to 9 are satisfied.

Condition 1: CRS is present
Condition 2: Number of CRS antenna ports for serving cell is 4
Condition 3: Value of frequency shift of CRS for serving cell is 0
Condition 4: Subframe is indicated as MBSFN subframe by parameter mbsfn-SubframeConfigList for serving cell
Condition 5: PDSCHs are transmitted through URS antenna ports 7 to 14
Condition 6: Number of CRS antenna ports indicated by parameter crs-PortsCount-r11 included in parameter set corresponding PDSCH is 1
Condition 7: Value of frequency shift indicated by parameter crs-FreqShift-r11 included in parameter set corresponding to PDSCH is 0
Condition 8: Subframe is indicated as non-MB SFN subframe by parameter mbsfn-SubframeConfigList-r11 included in parameter set corresponding to PDSCH
Condition 9: Resource element to which PDSCH is mapped is determined based on at least parameter crs-PortsCount-r11, parameter crs-FreqShift-r11 and parameter mbsfn-SubframeConfigList-r11.

In FIGS. 12 and 13, squares to which Ri (i=0, 1, 2, and 3) is assigned indicate resource elements to which the CRS transmitted through a CRS antenna port i is mapped. In FIGS. 12 and 13, squares to which U7 is assigned indicate resource elements to which the URS transmitted through URS antenna ports {7, 8, 11, 13} is mapped, and squares to which U9 is assigned indicate resource elements to which the URS transmitted through URS antenna ports {9, 10, 12, 14} is mapped. In FIGS. 12 and 13, squares hatched by dots indicate resource elements to which the PDSCH is mapped.

In FIG. 12, the terminal apparatus 1 set in the transmission mode 10 specifies the OFDM symbol index within the slot of the MBSFN subframe, in which the ratio of the corresponding PDSCH EPRE to the CRS EPRE of the serving cell is expressed by the $\rho_A$ or $\rho_B$, based on a row corresponding a case where the number of CRS antenna ports is 4 in the table of FIG. 11. That is, in FIG. 12, the OFDM symbols having the indices 0 and 1 within the slots satisfying $n_s$ mod 2=0 correspond to the $\rho_B$, and other OFDM symbols correspond to the $\rho_A$.

As stated above, the terminal apparatus 1 and the base station apparatus 3 can specify the OFDM symbol index within the slot of the subframe, in which the ratio of the corresponding PDSCH EPRE to the CRS EPRE of the serving cell is expressed by the $\rho_A$ or $\rho_B$, based on the number of CRS antenna ports for the serving cell and the parameter mbsfn-SubframeConfigList for the serving cell, irrespective of the parameter set. Since the OFDM symbol index within the slot of the subframe can be specified, the structures of the terminal apparatus 1 and the base station apparatus 3 can be simplified.

In FIG. 12, the OFDM symbol index within the slot of the subframe, in which the ratio of the corresponding PDSCH EPRE to the CRS EPRE of the serving cell is expressed by the $\rho_A$ or $\rho_B$, is specified based on a position of the CRS different from the position of the CRS used to determine the resource element to which the PDSCH is mapped. As a result, even though the CRS is not included in the OFDM symbol having the index 1 in the slot satisfying $n_s$ mod 2=0 in FIG. 12, the PDSCH EPRE for boosting the CRS may be reduced, and even though the CRS is included in the OFDM symbols having the index 4 in the slot satisfying $n_s$ mode 2=0 and the OFDM symbols having the indices 0 and 4 in the slot satisfying $n_s$ mode 2=1 in FIG. 12, the PDSCH EPRE for boosting the CRS is not reduced. Accordingly, there is a problem that the transmission power for the transmission of the PDSCH and the boosting of the CRS is not appropriately performed.

In a case where the PDSCH is transmitted through the URS antenna port in the subframe in which the CRS is present and the subframe is indicated as the non-MB SFN subframe by the parameter mbsfn-SubframeConfigList-r11 included in the parameter set corresponding to the PDSCH, the terminal apparatus 1 set in the transmission mode 10 may specify the OFDM symbol index within the slot of the subframe, in which the ratio of the corresponding PDSCH EPRE to the CRS EPRE of the serving cell is expressed by the $\rho_A$ or $\rho_B$, based on the table of FIG. 10.

In a case where the PDSCH is transmitted through the URS antenna port in the subframe in which the CRS is present and the subframe is indicated as the MBSFN subframe by the parameter mbsfn-SubframeConfigList-r11 included in the parameter set corresponding to the PDSCH, the terminal apparatus 1 set in the transmission mode 10 may specify the OFDM symbol index within the slot of the subframe, in which the ratio of the corresponding PDSCH EPRE to the CRS EPRE of the serving cell is expressed by the $\rho_A$ or $\rho_B$, based on the table of FIG. 11.

In a case where the PDSCH is transmitted through the URS antenna port in the subframe in which the CRS is present, the terminal apparatus 1 set in the transmission mode 10 may specify the OFDM symbol index within the slot of the subframe, in which the ratio of the corresponding PDSCH EPRE to the CRS EPRE of the serving cell is expressed by the $\rho_A$ or $\rho_B$, based on the table of FIG. 10 or 11 and the parameter crs-FreqShift-r11 included in the parameter set corresponding to the PDSCH.

In FIG. 13, the terminal apparatus 1 set in the transmission mode 10 specifies the OFDM symbol index within the slot of the non-MB SFN, in which the ratio of the corresponding PDSCH EPRE to the CRS EPRE of the serving cell is expressed by the $\rho_A$ or $\rho_B$, based on a row corresponding to a case where the number of CRS antenna ports in the table of FIG. 10 is 1. That is, in FIG. 13, the OFDM symbols having the indices 0 and 4 in the slots satisfying $n_s$ mode 2=0, 1 correspond to the $\rho_B$, and other OFDM symbols correspond to the $\rho_A$.

As discussed above, since the terminal apparatus 1 and the base station apparatus 3 can specify the OFDM symbol index within the slot of the subframe, in which the ratio of the corresponding PDSCH EPRE to the CRS EPRE of the serving cell is expressed by the $\rho_A$ or $\rho_B$, based on the parameter set corresponding to the PDSCH, irrespective of the number of CRS antenna ports for the serving cell and the parameter mbsfn-SubframeConfigList for the serving cell, the base station apparatus 3 appropriately can control the transmission power for the transmission of the PDSCH and the boosting of the CRS.

Hereinafter, the structures of the apparatuses according to the present embodiment will be described.

Figure 14:
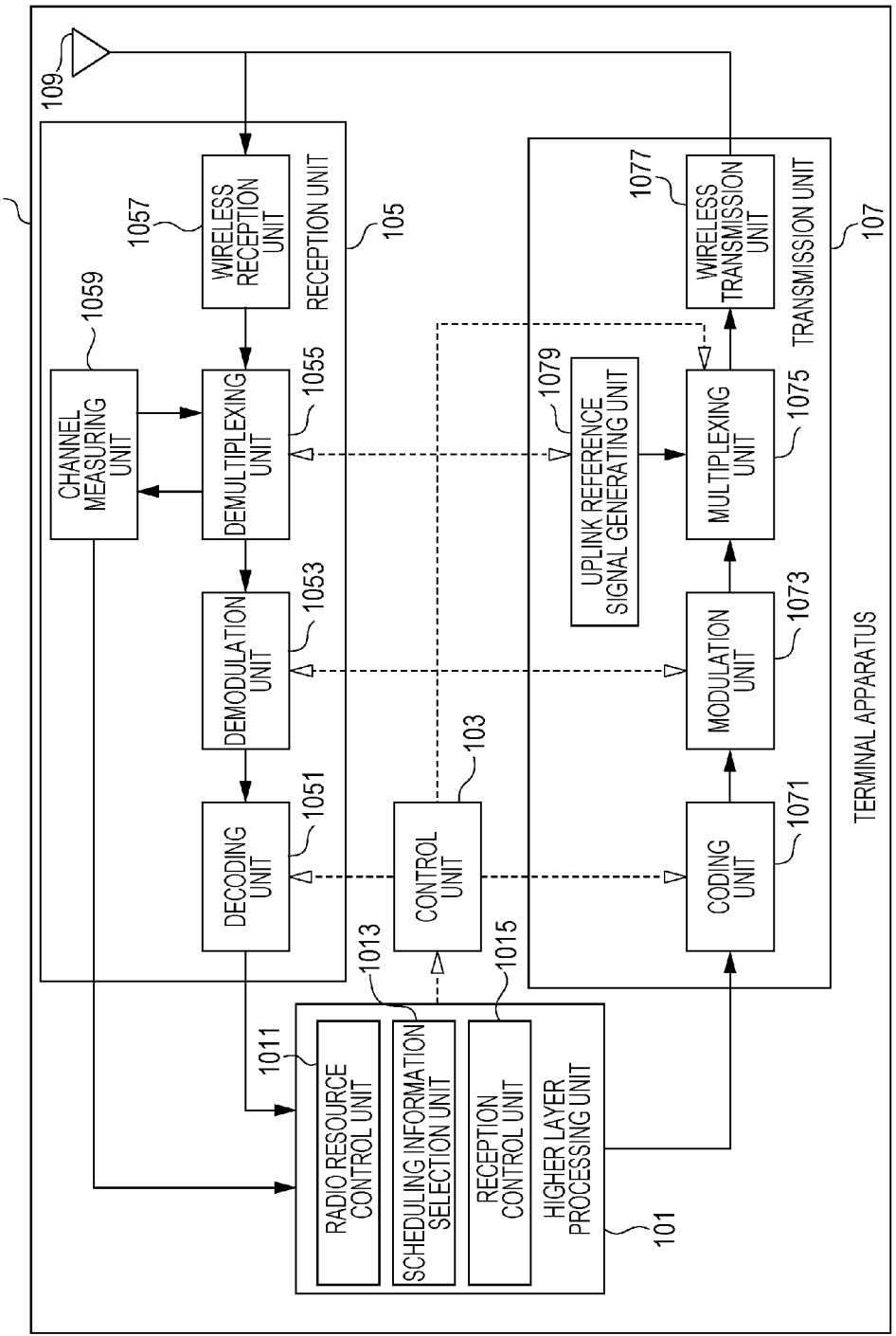
FIG. 14 is a schematic block diagram showing the structure of a terminal apparatus 1 according to the present embodiment.

FIG. 14 is a schematic block diagram showing the structure of the terminal apparatus 1 according to the present embodiment. As shown in the drawing, the terminal apparatus 1 includes a higher layer processing unit 101, a control unit 103, a reception unit 105, a transmission unit 107, and a transmission/reception antenna 109. The higher layer processing unit 101 includes a radio resource control unit 1011, a scheduling information interpretation unit 1013, and a reception control unit 1015. The reception unit 105 includes a decoding unit 1051, a demodulation unit 1053, a demultiplexing unit 1055, a wireless reception unit 1057, and a channel measuring unit 1059. The transmission unit 107 includes a coding unit 1071, a modulation unit 1073, a multiplexing unit 1075, a wireless transmission unit 1077, and an uplink reference signal generating unit 1079.

The higher layer processing unit 101 outputs uplink data (transport block) generated by, for example, the operation of a user to the transmission unit 107. The higher layer processing unit 101 processes a medium access control (MAC) layer, a packet data convergence protocol (PDCP) layer, a radio link control (RLC) layer, and a radio resource control (RRC) layer.

The radio resource control unit 1011 of the higher layer processing unit 101 manages various kinds of configuration information of the terminal apparatus. The radio resource control unit 1011 sets various types of configuration information/parameters based on the higher layer signal received from the base station apparatus 3. That is, the radio resource control unit 1011 sets various types of configuration information/parameters based on information indicating various types of configuration information/parameters received from the base station apparatus 3. In addition, the radio resource control unit 1011 generates information arranged in each uplink channel, and outputs the information to the transmission unit 107.

The scheduling information interpretation unit 1013 of the higher layer processing unit 101 interprets the DCI format (scheduling information) which is received through the reception unit 105, generates control information for controlling the reception unit 105 and the transmission unit 107, based on the interpretation result of the DCI format, and outputs the control information to the control unit 103.

The reception control unit 1015 of the higher layer processing unit 101 specifies the resource element to which the PDSCH is mapped, the first ratio $\rho_A$, the second ratio $\rho_B$, the third ratio $(\rho_A/\rho_B)$, the OFDM symbol index corresponding to the first ratio $\rho_A$ and/or the OFDM symbol index corresponding to the second ratio $\rho_B$, based on the various types of configuration information/parameters managed by the radio resource control unit 1011. The reception unit 105 or the demultiplexing unit 1055 may have the function of the reception power control unit 1015.

The control unit 103 generates control signals for controlling the reception unit 105 and the transmission unit 107, based on the control information from the higher layer processing unit 101. The control unit 103 outputs the generated control signals to the reception unit 105 and the transmission unit 107 to control the reception unit 105 and the transmission unit 107.

The reception unit 105 performs demultiplexing, demodulation, and decoding on the reception signal which is received from the base station apparatus 3 through the transmission/reception antenna 109 in response to the control signal input from the control unit 103, and outputs the decoded information to the higher layer processing unit 101.

The wireless reception unit 1057 converts (down-conversion) the downlink signal received through the transmission/reception antenna 109 into a baseband signal through orthogonal demodulation to remove an unnecessary frequency component, controls an amplification level such that a signal level is appropriately maintained, performs the orthogonal demodulation on the signal, based on the orthogonal component and an in-phase component of the received signal, and converts the orthogonal-demodulated analog signal into a digital signal. The wireless reception unit 1057 removes a portion corresponding to a cyclic prefix (CP) from the converted digital signal, performs a fast Fourier transform (FFT) on a signal from which the CP has been removed, and extracts a signal of the frequency domain.

The demultiplexing unit 1055 demultiplexes the extracted signal into the PHICH, the PDCCH, the EPDCCH, the PDSCH, and the downlink reference signal. In addition, the demultiplexing unit 1055 compensates for the channel of the PHICH, the PDCCH, the EPDCCH, and the PDSCH from the estimated value of the channel input from the channel measuring unit 1059. The demultiplexing unit 1055 outputs the demultiplexed downlink reference signal to the channel measuring unit 1059.

The demodulation unit 1053 multiplies the PHICH by a corresponding code to synthesize them, demodulates the synthesized signal using a binary phase shift keying (BPSK) modulation method, and outputs the demodulated signal to the decoding unit 1051. The decoding unit 1051 decodes the PHICH addressed to the terminal apparatus, and outputs the decoded HARQ indicator to the higher layer processing unit 101. The demodulation unit 1053 demodulates the PDCCH and/or the EPDCCH using a QPSK modulation method, and outputs the demodulated PDCCH and/or EPDCCH to the decoding unit 1051. The decoding unit 1051 tries to decode the PDCCH and/or the EPDCCH. In a case where decoding has succeeded, the decoding unit outputs the decoded downlink control information and the RNTI corresponding to the downlink control information to the higher layer processing unit 101.

The demodulation unit 1053 demodulates the PDSCH using a modulation method notified by the downlink grant, such as quadrature phase shift keying (QPSK), 16-quadrature amplitude modulation (QAM), or 64QAM, and outputs the demodulated PDSCH to the decoding unit 1051. The decoding unit 1051 performs decoding, based on information related to a coding rate notified by downlink control information, and outputs the decoded downlink data (transport block) to the higher layer processing unit 101.

The channel measuring unit 1059 measures a downlink path loss or a downlink channel state from the downlink reference signal input from the demultiplexing unit 1055, and outputs the measured path loss or channel state to the higher layer processing unit 101. The channel measuring unit 1059 calculates an estimated value of the channel of the downlink from the downlink reference signal, and outputs the estimated value to the demultiplexing unit 1055. The channel measuring unit 1059 performs channel measurement and/or interference measurement in order to calculate the CQI.

The transmission unit 107 generates an uplink reference signal in response to the control signal input from the control unit 103, codes and modulates the uplink data (transport block) input from the higher layer processing unit 101, multiplexes the PUCCH, the PUSCH, and the generated uplink reference signal, and transmits the multiplexed signal to the base station apparatus 3 through the transmission/reception antenna 109.

The coding unit 1071 performs coding, such as convolution cording or block coding, on the uplink control information input from the higher layer processing unit 101. In addition, the coding unit 1071 performs turbo cording, based on the information used to schedule the PUSCH.

The modulation unit 1073 modulates coded bits input from the coding unit 1071 using a modulation method notified by downlink control information such as BPSK, QPSK, 16QAM and 64QAM or a modulation method previously determined for each channel. The modulation unit 1073 determines the number of data sequences on which spatial multiplexing is performed based on information used for scheduling of the PUSCH, maps a plurality of uplink data items transmitted on the same PUSCH to a plurality of sequences by using multiple-input multiple-output (MIMO) spatial multiplexing (SM), and performs precoding on the sequences.

The uplink reference signal generating unit 1079 generates sequences obtained by a predetermined rule (expression), based on a physical cell identity (PCI, referred to as a cell ID) for identifying the base station apparatus 3, a bandwidth in which the uplink reference signal is arranged, a cyclic shift notified by the uplink grant, and a parameter value for generating the DMRS sequence. The multiplexing unit 1075 rearranges modulated symbols of the PUSCH in parallel in response to the control signals input from the control unit 103, and performs a discrete Fourier transform (DFT) on the rearranged symbols. The multiplexing unit 1075 multiplexes the PUCCH and PUSCH signals and the generated uplink reference signal for each transmission antenna port. That is, the multiplexing unit 1075 arranges the PUCCH and PUSCH signals and the generated uplink reference signal in the resource elements for each transmission antenna port.

The wireless transmission unit 1077 performs an inverse fast Fourier transform (IFFT) on the multiplexed signals to generate the SC-FDMA symbols, adds the CP to the generated SC-FDMA symbol to generate a baseband digital signal, and converts the baseband digital signal into an analog signal. Thereafter, the wireless transmission unit removes extra frequency components using a low-pass filter, and performs up-conversion on a signal having a carrier frequency. Subsequently, the wireless transmission unit amplifies a power, and transmits the amplified signal to the transmission/reception antenna 109.

Figure 15:
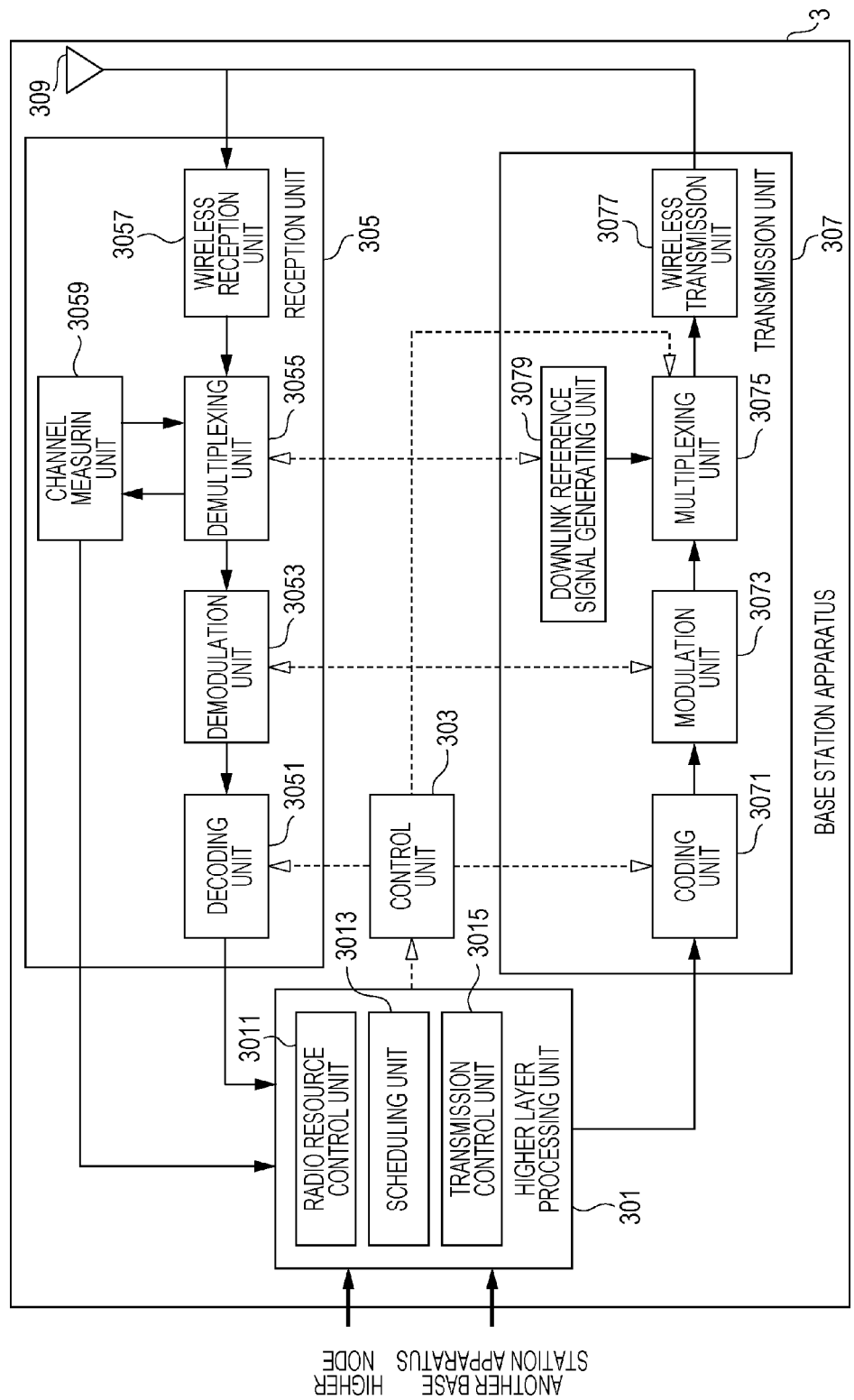
FIG. 15 is a schematic block diagram showing the structure of a base station apparatus 3 according to the present embodiment.

FIG. 15 is a schematic block diagram showing the structure of the base station apparatus 3 according to the present embodiment. As shown in the drawing, the base station apparatus 3 includes a higher layer processing unit 301, a control unit 303, a reception unit 305, a transmission unit 307, and a transmission/reception antenna 309. The higher layer processing unit 301 includes a radio resource control unit 3011, a scheduling unit 3013, and a transmission control unit 3015. The reception unit 305 includes a decoding unit 3051, a demodulation unit 3053, a demultiplexing unit 3055, a wireless reception unit 3057, and a channel measuring unit 3059. The transmission unit 307 includes a coding unit 3071, a modulation unit 3073, a multiplexing unit 3075, a wireless transmission unit 3077, and a downlink reference signal generating unit 3079.

The higher layer processing unit 301 processes a medium access control (MAC) layer, a packet data convergence protocol (PDCP) layer, a radio link control (RLC) layer, and a radio resource control (RRC) layer. In addition, the higher layer processing unit 301 generates control information for controlling the reception unit 305 and the transmission unit 307, and outputs the control information to the control unit 303.

The radio resource control unit 3011 of the higher layer processing unit 301 generates, for example, downlink data (transport block), system information, an RRC message, and a MAC control element (CE) to be arranged in downlink PDSCH or acquires these information items from a higher node, and outputs these information items to the transmission unit 307. In addition, the radio resource control unit 3011 manages various kinds of configuration information/parameters of each of the terminal apparatuses 1.

The radio resource control unit 1011 may set the various types of configuration information/parameters to each the terminal apparatuses 1 by using the higher layer signal. That is, the radio resource control unit 1011 transmits and broadcasts information indicating various types of configuration information/parameters.

The scheduling unit 3013 of the higher layer processing unit 301 determines a frequency and a subframe to which the physical channels (PDSCH and PUSCH) are allocated, a coding rate and a modulation method of the physical channels (PDSCH and PUSCH), and a transmission power from the received channel state information, the channel quality and the estimated value of the channel input from the channel measuring unit 3059. The scheduling unit 3013 generates control information (for example, the DCI format) for controlling the reception unit 305 and the transmission unit 307, based on the scheduling result, and outputs the generated control information to the control unit 303. The scheduling unit 3013 further determines a timing when the transmitting process and the receiving process are performed.

The transmission control unit 3015 of the higher layer processing unit 301 determines the resource element to which the PDSCH is mapped, the first ratio $\rho_A$, the second ratio $\rho_B$, the third ratio $(\rho_A/\rho_B)$, the OFDM symbol index corresponding to the first ratio $\rho_A$ and/or the OFDM symbol index corresponding to the second ratio $\rho_B$, based on the various types of configuration information/parameters managed by the radio resource control unit 1011, and controls the mapping of the PDSCH and the PDSCH EPRE. The transmission unit 307 and the multiplexing unit 305 may have a function of the transmission power control unit 3015.

The control unit 303 generates control signals for controlling the reception unit 305 and the transmission unit 307, based on the control information from the higher layer processing unit 301. The control unit 303 outputs the generated control signals to the reception unit 305 and the transmission unit 307 to control the reception unit 305 and the transmission unit 307.

The reception unit 305 performs demultiplexing, demodulation and decoding on the reception signal received from the terminal apparatus 1 through the transmission/reception antenna 309 in response to the control signals input from the control unit 303, and outputs the decoded information to the higher layer processing unit 301. The wireless reception unit 3057 converts the uplink signal received through the transmission/reception antenna 309 into a baseband signal through orthogonal demodulation (down-conversion), and removes unnecessary frequency components. Thereafter, the wireless reception unit controls an amplification level such that the signal level is appropriately maintained, performs orthogonal demodulation on the signal based on the in-phase component and the orthogonal component of the received signal, and converts the orthogonal-demodulated analog signal into a digital signal.

The wireless reception unit 3057 removes a portion corresponding to a cyclic prefix (CP) from the converted digital signal. The wireless reception unit 3057 performs fast Fourier transform (FFT) on the signal from which the CP has been removed, extracts a signal of the frequency domain, and outputs the extracted signal to the demultiplexing unit 3055.

The demultiplexing unit 1055 demultiplexes the signal input from the wireless reception unit 3057 into signals, such as the PUCCH, the PUSCH, and the uplink reference signal. The demultiplexing process is previously determined by the radio resource control unit 3011 of the base station apparatus 3, and is performed based on the allocation information of the radio resources included in the uplink grant which is notified to each terminal apparatus 1. In addition, the demultiplexing unit 3055 compensates for the channels of the PUCCH and the PUSCH from the estimated value of the channel input from the channel measuring unit 3059. The demultiplexing unit 3055 outputs the demultiplexed uplink reference signal to the channel measuring unit 3059.

The demodulation unit 3053 performs inverse discrete Fourier transform (IDFT) on the PUSCH to acquire modulated symbols, and demodulates the received signal using a modulation method which is predetermined for each of the modulated symbols of the PUCCH and the PUSCH, a predetermined modulation method such as BPSK, QPSK, 16QAM, or 64QAM, or a modulation method which is previously notified from the base station apparatus to each terminal apparatus 1 using the uplink grant. The demodulation unit 3053 demultiplexes the modulated symbols of a plurality of uplink data items which are transmitted on the same PUSCH by using the MIMO SM, based on the number of spatial-multiplexed sequences previously notified to each terminal apparatus 1 using the uplink grant and information indicating precoding on the sequences.

The decoding unit 3051 decodes the coded bits of the demodulated PUCCH and PUSCH at a predetermined coding rate of a predetermined coding method or a coding rate which is previously notified from the base station apparatus to the terminal apparatus 1 using the uplink grant, and outputs the decoded uplink data and the uplink control information to the higher layer processing unit 101. In a case where the PUSCH is retransmitted, the decoding unit 3051 performs decoding using the coded bits, which have been input from the higher layer processing unit 301 and then stored in an HARQ buffer, and the demodulated coded bits. The channel measuring unit 309 measures, for example, the estimated value of the channel and the quality of the channel from the uplink reference signal input from the demultiplexing unit 3055, and outputs the measured values to the demultiplexing unit 3055 and the higher layer processing unit 301.

The transmission unit 307 generates a downlink reference signal, performs coding and modulation on the HARQ indicator, downlink control information, and downlink data input from the higher layer processing unit 301, multiplexes the PHICH, the PDCCH, the EPDCCH, the PDSCH, and the downlink reference signal, and transmits the signals to the terminal apparatus 1 through the transmission/reception antenna 309, in response to the control signal input from the control unit 303.

The coding unit 3071 codes the HARQ indicator, downlink control information, and downlink data input from the higher layer processing unit 301 using a predetermined coding method, such as block coding, convolution coding, or turbo coding, or the coding method determined by the radio resource control unit 3011. The modulation unit 3073 modulates the coded bits input from the coding unit 3071 using a predetermined modulation method such as BPSK, QPSK, 16QAM or 64QAM, or the modulation method determined by the radio resource control unit 3011.

The downlink reference signal generating unit 3079 generates, as the downlink reference signal, the sequence which has been known to the terminal apparatus 1 and is calculated according to a predetermined rule, based on the physical cell identity (PCI) for identifying the base station apparatus 3. The multiplexing unit 3075 multiplexes the modulated symbol of each modulated channel and the generated downlink reference signal. That is, the multiplexing unit 3075 arranges the modulated symbol of each modulated channel and the generated downlink reference signal in the resource elements.

The wireless transmission unit 3077 performs inverse fast Fourier transform (IFFT) on the multiplexed modulated symbol to generate the OFDM symbol, adds the CP to the generated OFDM symbol, and generates a baseband digital signal. Subsequently, the wireless transmission unit converts the baseband digital signal into an analog signal, removes extra frequency components by a low pass filter, and performs up-conversion on the signal having a carrier frequency. Thereafter, the wireless transmission unit amplifies a power, and outputs and transmits the amplified power through the transmission/reception antenna 309.

That is, the terminal apparatus 1 according to the present embodiment includes the reception unit 105 that receives information indicating the parameter noCRS-Config-r12 indicating the subframe in which the CRS is not present, information indicating the parameter mbsfn-SubframeConfigList indicating the MBSFN subframe in the serving cell, information indicating the parameter mbsfn-SubframeConfigList-r11 indicating the MBSFN subframe and determining the resource element to which the PDSCH is mapped, information indicating the parameter crs-PortsCount-r11 indicating the number of CRS antenna ports and determining the resource element to which the PDSCH is mapped, and information indicating the parameter p-b related to the third ratio between the first ratio of the PDSCH EPRE to the CRS EPRE of the serving cell and the second ratio of the PDSCH EPRE to the CRS EPRE of the serving cell.

In a case where the PDSCH transmitted through the URS antenna port different from the CRS antenna port for the serving cell is received in the subframe indicated as the subframe in which the CRS is not present by the parameter noCRS-Config-r12, the reception unit 105 and/or the reception control unit 1015 of the terminal apparatus 1 according to the present embodiment specifies the OFDM symbol corresponding to the first ratio and the resource element to which the PDSCH is mapped by assuming that the number of CRS antenna ports is 0, irrespective of the number of the CRS antenna ports indicated by the parameter crs-PortsCount-r11 corresponding to the PDSCH.

In the case where the PDSCH transmitted through the URS antenna port different from the CRS antenna port for the serving cell is received, the reception unit 105 and/or the reception control unit 1015 may specify the resource element to which the PDSCH is mapped, the OFDM symbol corresponding to the second ratio and the OFDM symbol corresponding to the first ratio, based on the number of CRS antenna ports indicated by the parameter crs-PortsCount-r11 corresponding to the PDSCH and whether or not the subframe in which the PDSCH is received is indicated as the MBSFN subframe by the parameter mbsfn-SubframeConfigList-r11, even though the subframe in which the PDSCH is received is indicated as the subframe in which the CRS is not present by the parameter noCRS-Config-r12.

In a case where the parameter crs-PortsCount-r11 and the parameter mbsfn-SubframeConfigList-r11 are set and the PDSCH, which is mapped to the resource element determined based on at least the parameter mbsfn-SubframeConfigst-r11 and the parameter crs-PortsCount-r11 in a subframe other than the subframe indicated as the subframe in which the CRS is not present by the parameter noCRS-Config-r12 and is transmitted through the URS antenna port different from the CRS antenna port for the serving cell, is received, the reception unit 105 and/or the reception control unit 1015 specifies the OFDM symbol corresponding to the first ratio and the OFDM symbol corresponding to the second ratio, based on the number of CRS antenna ports for the serving cell and whether or not the subframe in which the PDSCH is received is indicated as the MBSFN subframe by the parameter mbsfn-SubframeConfigList.

In a case where the parameter crs-PortsCount-r11 and the parameter mbsfn-SubframeConfigList-r11 are set and the PDSCH, which is mapped to the resource element determined based on at least the parameter mbsfn-SubframeConfigst-r11 and the parameter crs-PortsCount-r11 in a subframe other than the subframe indicated as the subframe in which the CRS is not present by the parameter noCRS-Config-r12 and is transmitted through the URS antenna port different from the CRS antenna port for the serving cell, is received, the reception unit 105 and/or the reception control unit 1015 may specify the OFDM symbol corresponding to the first ratio and the OFDM symbol corresponding to the second ratio, based on the number of CRS antenna ports indicated by the parameter crs-PortsCount-r11 and whether or not the subframe in which the PDSCH is received is indicated as the MBSFN subframe by the parameter mbsfn-SubframeConfigList-r11.

In a case where the parameter crs-PortsCount-r11 and the parameter mbsfn-SubframeConfigList-r11 are set and the PDSCH, which is mapped to the resource element determined based on at least the parameter mbsfn-SubframeConfigst and the number of CRS antenna ports in the serving cell in a subframe other than the subframe indicated as the subframe in which the CRS is not present by the parameter noCRS-Config-r12 and is transmitted through the CRS antenna port for the serving cell, is received, the reception unit 105 and/or the reception control unit 1015 specifies the OFDM symbol corresponding to the first ratio and the OFDM symbol corresponding to the second ratio, based on the number of CRS antenna ports in the serving cell and whether or not the subframe in which the PDSCH is received is indicated as the MBSFN subframe by the parameter mbsfn-SubframeConfigList.

In a case where the parameter crs-PortsCount-r11 and the parameter mbsfn-SubframeConfigList-r11 are not set, the reception unit 105 and/or the reception control unit 1015 specifies the OFDM symbol corresponding to the first ratio and the OFDM symbol corresponding to the second ratio, based on the number of CRS antenna ports in the serving cell and whether or not the subframe in which the PDSCH is received is indicated as the MBSFN subframe by the parameter mbsfn-SubframeConfigList.

The base station apparatus 3 according to the present embodiment includes the transmission unit 307 that transmits information indicating the parameter noCRS-Config-r12 indicating the subframe in which the CRS is not present, information indicating the parameter mbsfn-SubframeConfigList indicating the MBSFN subframe in the serving cell, information indicating the parameter mbsfn-SubframeConfigList-r11 indicating the MBSFN subframe and determining the resource element to which the PDSCH is mapped, information indicating the parameter crs-PortsCount-r11 indicating the number of CRS antenna ports and determining the resource element to which the PDSCH is mapped, and information indicating the parameter p-b related to the third ratio between the first ratio of the PDSCH EPRE to the CRS EPRE of the serving cell and the second ratio of the PDSCH EPRE to the CRS EPRE of the serving cell.

In a case where the PDSCH is transmitted through the URS antenna port different from the CRS antenna port for the serving cell in the subframe indicated as the subframe in which the CRS is not present by the parameter noCRS-Config-r12, the transmission unit 307 and/or the transmission control unit 3015 of the base station apparatus 3 according to the present embodiment determines the OFDM symbol corresponding to the first ratio and the resource element to which the PDSCH is mapped, maps the PDSCH to the determined resource element, and controls the transmission control for the PDSCH, by assuming that the number of CRS antenna ports is 0 irrespective of the number of CRS antenna ports indicated by the parameter crs-PortsCount-r11 corresponding to the PDSCH.

In a case where the PDSCH is transmitted through the URS antenna port different from the CRS antenna port for the serving cell, the transmission unit 307 and/or the transmission control unit 3015 may determine the resource element to which the PDSCH is mapped, the OFDM symbol corresponding to the first ratio and the OFDM symbol corresponding to the second ratio, may map the PDSCH to the determined resource element, and may control the transmission power for the PDSCH, based on the number of CRS antenna ports indicated by the parameter crs-PortsCount-r11 corresponding to the PDSCH and whether or not the subframe in which the PDSCH is transmitted is indicated as the MBSFN subframe by the parameter mbsfn-SubframeConfigList-r11 even though the subframe in which the PDSCH is transmitted is indicated as the subframe in which the CRS is not present by the parameter noCRS-Config-r12.

In a case where the parameter crs-PortsCount-r11 and the parameter mbsfn-SubframeConfigList-r11 are set to the terminal apparatus, the PDSCH is mapped to the resource element determined based on at least the parameter crs-PortsCount-r11 and the parameter mbsfn-SubframeConfigList-r11 in a subframe other than the subframe indicated as the subframe in which the CRS is not present by the parameter noCRS-Config-r12 and the PDSCH is transmitted through the URS antenna port different from the CRS antenna port for the serving cell, the transmission unit 307 and/or the transmission control unit 3015 determines the OFDM symbol corresponding to the first ratio and the OFDM symbol corresponding to the second ratio, and controls the transmission power for the PDSCH, based on the number of CRS antenna ports for the serving cell and whether or not the subframe in which the PDSCH is transmitted is indicated as the MBSFN subframe by the parameter mbsfn-SubframeConfigList.

In the case where the parameter crs-PortsCount-r11 and the parameter mbsfn-SubframeConfigList-r11 are set to the terminal apparatus, the PDSCH is mapped to the resource element determined based on at least the parameter crs-PortsCount-r11 and the parameter mbsfn-SubframeConfigList-r11 in a subframe other than the subframe indicated as the subframe in which the CRS is not present by the parameter noCRS-Config-r12, and the PDSCH is transmitted through the URS antenna port different from the CRS antenna port for the serving cell, the transmission unit 307 and/or the transmission control unit 3015 may determine the OFDM symbol corresponding to the first ratio and the OFDM symbol corresponding to the second ratio, and may control the transmission power for the PDSCH, based on the number of CRS antenna ports indicated by the parameter crs-PortsCount-r11 and whether or not the subframe in which the PDSCH is transmitted is indicated as the MBSFN subframe by the parameter mbsfn-SubframeConfigList-r11.

In the case where the parameter crs-PortsCount-r11 and the parameter mbsfn-SubframeConfigList-r11 are set to the terminal apparatus, the PDSCH is mapped to the resource element determined based on at least the parameter mbsfn-SubframeConfigList and the number of CRS antenna ports in the serving cell in a subframe other than the subframe indicated as the subframe in which the CRS is not present by the parameter noCRS-Config-r12, and the PDSCH is transmitted through the same antenna port as the CRS antenna port for the serving cell, the transmission unit 307 and/or the transmission control unit 3015 specifies the OFDM symbol corresponding to the first ratio and the OFDM symbol corresponding to the second ratio, and controls the transmission power for the PDSCH, based on the number of CRS antenna ports in the serving cell and whether or not the subframe in which the PDSCH is transmitted is indicated as the MBSFN subframe by the parameter mbsfn-SubframeConfigList.

In a case where the parameter crs-PortsCount-r11 and the parameter mbsfn-SubframeConfigList-r11 are not set to the terminal apparatus and the PDSCH is received in a subframe other than the subframe indicated as the subframe in which the CRS is not present by the parameter noCRS-Config-r12, the transmission unit 307 and/or the transmission control unit 3015 specifies the OFDM symbol corresponding to the first ratio and the OFDM symbol corresponding to the second ratio, and controls the transmission power for the PDSCH, based on the number of CRS antenna ports in the serving cell and whether or not the subframe in which the PDSCH is received is indicated as the MBSFN subframe by the parameter mbsfn-SubframeConfigList.

The specifying of the OFDM symbol means that the index of the OFDM is specified.

Accordingly, the terminal apparatus and the base station apparatus can efficiently communicate using the PDSCH. It is possible to efficiently map the downlink physical channel to the resource element. It is possible to efficiently control the transmission power for the transmission on the downlink physical channel.

The program which runs on the base station apparatus 3 and the terminal apparatus 1 according to the present invention may be a program (which causes a computer to function) which controls a central processing unit (CPU) such that the functions of the above-described embodiment of the present invention are implemented. The information handled by these apparatuses is temporarily stored in a random access memory (RAM) during the process and is then stored in various types of read only memories (ROMs), such as a flash ROM, or a hard disk drive (HDD). Then, the CPU reads, corrects, and writes the information, if necessary.

Some functions of the terminal apparatus 1 and the base station apparatus 3 according to the above-described embodiment may be implemented by a computer. In this case, a program for implementing the control function may be recorded on a computer-readable recording medium and a computer system may read the program recorded on the recording medium and execute the program to implement the functions.

The term "computer system" means a computer system that is provided in the terminal apparatus 1 or the base station apparatus 3 and includes an OS or hardware such as peripheral apparatuses. The term "computer-readable recording medium" means a portable medium, such as a flexible disk, a magneto-optical disk, a ROM, or a CD-ROM, or a storing device, such as a hard disc provided in the computer system.

The "computer-readable recording medium" may include a recording medium that dynamically stores the program in a short time, such as a communication cable used in a case where the program is transmitted through a network, such as the Internet, or a communication line, such as a telephone line, and a recording medium that stores the program for a predetermined period of time, such as a volatile memory in a computer system that serves as a server or a client in this case. The "program" may be a program that implements some of the above-mentioned functions or a program that implements the above-mentioned functions in combination with the program which has been stored in the computer system.

The base station apparatus 3 according to the above-described embodiment may be realized as an aggregate (apparatus group) of a plurality of apparatuses. Each of the apparatuses forming the apparatus group may have some or all of the functions or the functional blocks of the base station apparatus 3 according to the above-described embodiment. The apparatus group may have each function or each functional block of the base station apparatus 3. The terminal apparatus 1 according to the above-described embodiment can communicate with the base station apparatus which is an aggregate of apparatuses.

The base station apparatus 3 according to the above-described embodiment may be an evolved universal terrestrial radio access network (EUTRAN). In addition, the base station apparatus 3 according to the above-described embodiment may have some or all of the functions of a higher node of eNodeB.

Each of the terminal apparatus 1 and the base station apparatus 3 according to the above-described embodiments may be partly or entirely realized in the form of an LSI, which is a typical integrated circuit, or a chip set. Each functional block of the terminal apparatus 1 and the base station apparatus 3 may be individually integrated into a chip, or some or all of the functional blocks may be integrated into a chip. A method for achieving the integrated circuit is not limited to the LSI and it may be achieved by a dedicated circuit or a general-purpose processor. In addition, in a case where a technique for achieving an integrated circuit which replaces the LSI technique will be developed with the progress of a semiconductor technique, the integrated circuit manufactured by the developed technique can also be used.

In the above-described embodiment, the terminal apparatus is given as an example of a terminal apparatus or a communication apparatus. However, the invention is not limited thereto. The invention can also be applied to terminal apparatuses or communication apparatuses of stationary or non-movable electronic apparatuses which are installed indoors or outdoors, such as AV apparatuses, kitchen apparatuses, cleaning and washing machines, air conditioners, office apparatuses, vending machines, and other home appliances.

The embodiment of the invention has been described above in detail with reference to the drawings. However, the detailed structure is not limited to the above-described embodiment and the invention also includes a change in the design within the scope and spirit of the invention. Various modifications and changes of the invention can be made without departing from the scope of the claims and the technical range of the invention includes embodiments obtained by appropriately combining technical means described in different embodiments. In addition, the elements which are described in each of the above-described embodiments and have the same effect may be replaced with each other.

DESCRIPTION OF REFERENCE NUMERALS 1 (1A, 1B, 1C) Terminal apparatus
3 Base station apparatus
101 Higher layer processing unit
103 Control unit
105 Reception unit
107 Transmission unit
109 Transmission and reception antenna
301 Higher layer processing unit
303 Control unit
305 Reception unit
307 Transmission unit
309 Transmission and reception antenna
1011 Radio resource control unit
1013 Scheduling information interpretation unit
1015 Reception control unit
3011 Radio resource control unit
3013 Scheduling unit
3015 Transmission control unit

The invention claimed is:

1. A terminal apparatus that is configured to communicate with a base station apparatus, the terminal apparatus comprising:
a reception circuit configured to and/or programmed to receive first information indicating a first subframe in which a cell-specific reference signal (CRS) is present and a second subframe in which the CRS is not present, and second information which indicates the second subframe as a multicast broadcast single frequency network (MBSFN) subframe, the second subframe being a subframe other than the first subframe; wherein
the reception circuit is configured to and/or programmed to receive third information indicating a third ratio between a first ratio of PDSCH energy per resource element (EPRE) to CRS EPRE of a serving cell and a second ratio of the PDSCH EPRE to the CRS EPRE of the serving cell, and
in the second subframe, an orthogonal frequency division multiplexing (OFDM) symbol corresponding to the first ratio and an OFDM symbol corresponding to the second ratio are based on the number of CRS antenna ports of the serving cell.

2. A communication method used in a terminal apparatus that is configured to communicate with a base station apparatus, the communication method comprising:
receiving first information indicating a first subframe in which a cell-specific reference signal (CRS) is present and a second subframe in which the CRS is not present, and second information which indicates the second subframe as a multicast broadcast single frequency network (MBSFN) subframe, the second subframe being a subframe other than the first subframe; and
receiving fourth information indicating a third ratio between a first ratio of PDSCH energy per resource element (EPRE) to CRS EPRE of a serving cell and a second ratio of the PDSCH EPRE to the CRS EPRE of the serving cell; wherein
in the second subframe, an orthogonal frequency division multiplexing (OFDM) symbol corresponding to the first ratio and an OFDM symbol corresponding to the second ratio are based on the number of CRS antenna ports of the serving cell.

3. A base station apparatus that is configured to communicate with a terminal apparatus, the base station apparatus comprising:
a transmission circuit configured to and/or programmed to transmit first information indicating a first subframe in which a cell-specific reference signal (CRS) is present and a second subframe in which the CRS is not present, and second information which indicates the second subframe as a multicast broadcast single frequency network (MBSFN) subframe, the second subframe being a subframe other than the first subframe; wherein
the transmission circuit is configured to and/or programmed to transmit third information indicating a third ratio between a first ratio of PDSCH energy per resource element (EPRE) to CRS EPRE of a serving cell and a second ratio of the PDSCH EPRE to the CRS EPRE of the serving cell, and
in the second subframe, an orthogonal frequency division multiplexing (OFDM) symbol corresponding to the first ratio and an OFDM symbol corresponding to the second ratio are based on the number of CRS antenna ports of the serving cell.

4. A communication method used in a base station apparatus that is configured to communicate with a terminal apparatus, the communication method comprising:
transmitting first information indicating a first subframe in which a cell-specific reference signal (CRS) is present and a second subframe in which the CRS is not present, and second information which indicates the second subframe as a multicast broadcast single frequency network (MBSFN) subframe, the second subframe being a subframe other than the first subframe; and
transmitting third information indicating a third ratio between a first ratio of PDSCH energy per resource element (EPRE) to CRS EPRE of a serving cell and a second ratio of the PDSCH EPRE to the CRS EPRE of the serving cell, wherein
in the second subframe, an orthogonal frequency division multiplexing (OFDM) symbol corresponding to the first ratio and an OFDM symbol corresponding to the second ratio are based on the number of CRS antenna ports of the serving cell.

* * * * *